US012658191B1

(12) United States Patent
Liu et al.

(10) Patent No.: US 12,658,191 B1
(45) Date of Patent: Jun. 16, 2026

(54) AUTOMATIC SPEECH RECOGNITION

(71) Applicant: Amazon Technologies, Inc., Seattle, WA (US)

(72) Inventors: Jing Liu, Pittsburgh, PA (US); Qi Luo, Seattle, WA (US); Xinyu Ren, Etobicoke (CA); Ariya Rastrow, Seattle, WA (US); Ankur Gandhe, Bothell, WA (US); Denis Filimonov, Seattle, WA (US); Grant Strimel, Presto, PA (US); Andreas Stolcke, Berkeley, CA (US); Ivan Bulyko, Mercer Island, WA (US); Rahul Pandey, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 591 days.

(21) Appl. No.: 18/191,348

(22) Filed: Mar. 28, 2023

Related U.S. Application Data

(60) Provisional application No. 63/484,034, filed on Feb. 9, 2023.

(51) Int. Cl.
*G10L 17/22* (2013.01)
*G10L 17/02* (2013.01)
*G10L 17/18* (2013.01)

(52) U.S. Cl.
CPC .............. *G10L 17/22* (2013.01); *G10L 17/02* (2013.01); *G10L 17/18* (2013.01)

(58) Field of Classification Search
CPC .......... G10L 17/22; G10L 17/02; G10L 17/18
USPC ........................................ 704/232
See application file for complete search history.

(56) References Cited

U.S. PATENT DOCUMENTS

| | | | | |
|---|---|---|---|---|
| 11,217,231 | B2 * | 1/2022 | Prabhavalkar | .......... G10L 15/16 |
| 11,295,739 | B2 * | 4/2022 | Li | ............. G10L 15/22 |
| 11,526,808 | B2 * | 12/2022 | Etkin | ........ G06N 3/02 |
| 11,664,021 | B2 * | 5/2023 | Prabhavalkar | .......... G10L 15/16 |
| | | | | 704/231 |

(Continued)

FOREIGN PATENT DOCUMENTS

| | | | | |
|---|---|---|---|---|
| EP | 3928316 | B1 * | 3/2025 | ........... G06N 3/0464 |
| EP | 4531037 | A2 * | 4/2025 | ........... G06N 3/0464 |

(Continued)

OTHER PUBLICATIONS

William Chan, et al. 2016. "Listen, Attend and Spell: A Neural Network for Large Vocabulary Conversational Speech Recognition," 2016 IEEE International Conference on Acoustics, Speech and Signal Processing (ICASSP), pp. 4960-4964. Retrieved from https://arxiv.org/abs/1508.01211v2.

(Continued)

*Primary Examiner* — Edwin S Leland, III
(74) *Attorney, Agent, or Firm* — Pierce Atwood LLP

(57) ABSTRACT

A system that incorporates contextual entity information when performing automatic speech processing (ASR) using a neural network architecture. The system identifies entities that may be related to the context of an utterance. Text information and pronunciation information related to those entities are encoded and used to determine biasing data that is applied to encoded audio data. The resulting adjusted encoded audio data is processed by the existing neural network architecture to determine ASR data representing a transcription of the utterance.

18 Claims, 13 Drawing Sheets

(56) References Cited

U.S. PATENT DOCUMENTS

| | | | | |
|---|---|---|---|---|
| 11,948,570 B2 * | 4/2024 | Li | | G10L 15/22 |
| 12,300,216 B2 * | 5/2025 | Biadsy | | G10L 13/02 |
| 2020/0066271 A1 * | 2/2020 | Li | | G10L 15/02 |
| 2020/0357387 A1 * | 11/2020 | Prabhavalkar | | G06N 3/044 |
| 2020/0357388 A1 * | 11/2020 | Zhao | | G10L 15/26 |
| 2020/0401938 A1 * | 12/2020 | Etkin | | G06N 3/09 |
| 2020/0402501 A1 * | 12/2020 | Prabhavalkar | | G10L 15/16 |
| 2022/0101836 A1 * | 3/2022 | Prabhavalkar | | G10L 15/16 |
| 2022/0122579 A1 * | 4/2022 | Biadsy | | G10L 13/02 |
| 2022/0199084 A1 * | 6/2022 | Li | | G10L 15/22 |
| 2023/0230572 A1 * | 7/2023 | Biadsy | | G10L 13/02 |
| | | | | 704/200 |
| 2023/0274736 A1 * | 8/2023 | Prabhavalkar | | G10L 15/16 |
| | | | | 704/231 |
| 2024/0221750 A1 * | 7/2024 | Li | | G10L 15/18 |

FOREIGN PATENT DOCUMENTS

| | | | | | |
|---|---|---|---|---|---|
| JP | 2022521289 A | * | 4/2022 | | G06N 3/0464 |
| JP | 2022530284 A | * | 6/2022 | | G10L 19/04 |
| JP | 2022531479 A | * | 7/2022 | | G06N 3/044 |
| JP | 7200405 B2 | * | 1/2023 | | G10L 15/16 |
| JP | 7234415 B2 | * | 3/2023 | | G06N 3/09 |
| JP | 7244665 B2 | * | 3/2023 | | G06N 3/0464 |
| JP | 2023029416 A | * | 3/2023 | | G10L 19/04 |
| JP | 2023062147 A | * | 5/2023 | | G06N 3/09 |
| JP | 2023065681 A | * | 5/2023 | | G06N 3/0464 |
| JP | 7522246 B2 | * | 7/2024 | | G06N 3/0464 |
| JP | 7583080 B2 | * | 11/2024 | | G06N 3/09 |
| JP | 7635194 B2 | * | 2/2025 | | G10L 19/04 |
| KR | 20220004224 A | * | 1/2022 | | G06N 20/10 |
| KR | 102390940 B1 | * | 4/2022 | | G10L 19/04 |
| KR | 20220054704 A | * | 5/2022 | | G10L 19/04 |
| KR | 20230165395 A | * | 12/2023 | | G06N 3/0464 |
| WO | WO-2020171868 A1 | * | 8/2020 | | G06N 3/0464 |
| WO | WO-2020256838 A1 | * | 12/2020 | | G10L 19/04 |
| WO | WO-2025183882 A1 | * | 9/2025 | | G10L 25/30 |

OTHER PUBLICATIONS

Linhao Dong, et al. 2018. "Speech-Transformer: A No-Recurrence Sequence-to-Sequence Model for Speech Recognition." 2018 IEEE International Conference on Acoustics, Speech and Signal Processing (ICASSP), pp. 5884-5888. IEEE.

Alex Graves, et al. 2012. "SequenceTransduction with Recurrent Neural Networks." International Conference on Machine Learning (ICML) 2012 Workshop on Representation Learning, 9 pages. Retrieved from https://arxiv.org/abs/1211.3711v1.

Ching Feng Yeh, et al. 2019. "Transformer-Transducer: End-to-End Speech Recognition with Self-Attention." Retrieved from https://arxiv.org/abs/1910.12977v1, 5 pages.

Kanthashree Mysore Sathyendra, et al. 2022. "Contextual Adapters for Personalized Speech Recognition in Neural Transducers." Retrieved from https://arxiv.org/abs/2205.13660, 5 pages.

Feng-Ju Chang, et al. 2021. "Context-Aware Transformer Transducer for Speech Recognition." 2021 IEEE Automatic Speech Recognition and Understanding Workshop (ASRU). Retrieved from https://arxiv.org/abs/2111.03250v1, 8 pages.

Antoine Bruguier, et al. 2019. "Phoebe: Pronunciation-Aware Contextualization for End-to-End Speech Recognition." 2019 IEEE International Conference on Acoustics, Speech and Signal Processing, (ICASSP), pp. 6171-6175. Retrieved from https://www.bruguier.com/pub/phoebe.pdf.

Golan Pundak, et al. 2018. "Deep Context: End-to-End Contextual Speech Recognition." 2018 IEEE Spoken Language Technology Workshop (SLT), pp. 418-425. Retrieved from https://arxiv.org/abs/1808.02480v1.

Mahaveer Jain, et al. 2020. "Contextual RNN-T for Open Domain ASR." Proc. Interspeech 2020, pp. 11-15.

Anuroop Sriram, et al. 2018. "Cold Fusion: Training Seq2Seq Models Together with Language Models." Proc. Interspeech 2018, pp. 387-391.

Adithya Renduchintala, et al. 2018. "Multi-Modal Data Augmentation for End-to-End ASR." Proc. Interspeech 2018, pp. 2394-2398.

Anjuli Kannan, et al. 2018. "An Analysis of Incorporating an External Language Model into a Sequence-to-Sequence Model." 2018 IEEE International Conference on Acoustics, Speech and Signal Processing (ICASSP), pp. 5824-5828. Retrieved from https://arxiv.org/abs/1712.01996.

Shigeki Karita, et al. 2019. "Semi-Supervised End-to-End Speech Recognition Using Text-to-Speech and Autocoders." Proc. Interspeech 2018, pp. 6166-6170. Retrieved from https://arxiv.org/abs/2011.07754.

Antoine Bruguier, et al. 2016. "Learning Personalized Pronunciations for Contact Name Recognition." Proc. Interspeech 2016, pp. 3096-3100.

Aditya Gourav, et al. 2021. "Personalization Strategies for End-to-End Speech Recognition Systems." IEEE International Conference on Acoustics, Speech and Signal Processing (ICASSP), pp. 7348-7352. Retrieved from https://www.amazon.science/publications/personalization-strategies-for-end-to-end-speech-recognition-systems.

Duc Le, et al. 2021. "Contextualized Streaming End-to-End Speech Recognition with Trie-Based Deep Biasing and Shallow Fusion." Proc. Interspeech 2021, pp. 1772-1776.

Duc Le, et al. 2021. Deep Shallow Fusion for RNN-T Personalization. In 2021 IEEE Spoken Language Technology Workshop (SLT), pp. 251-257. Retrieved from https://arxiv.org/abs/2011.07754v1.

Ding Zhao, et al. 2019. "Shallow-Fusion End-to-End Contextual Biasing." Proc. Interspeech 2019, pp. 1418-1422.

Yanzhang He, et al. 2019. "Streaming End-to-end Speech Recognition for Mobile Devices." EEE International Conference on Acoustics, Speech and Signal Processing (ICASSP), pp. 6381-6385. Retrieved from https://arxiv.org/abs/1811.06621v1.

Liyan Xu, et al. 2022. "RescoreBERT: Discriminative Speech Recognition Rescoring With Bert." In Proc. IEEE ICASSP 2022, pp. 6117-6121. Retrieved from https://www.amazon.science/publications/rescorebert-discriminative-speech-recognition-rescoring-with-bert.

Zhehuai Chen, et al. 2019. "Joint Grapheme and Phoneme Embeddings for Contextual End-to-End ASR." Proc. Interspeech 2019, pp. 3490-3494.

Ashish Vaswani, et al. 2017. "Attention Is All You Need." In Advances in Neural Information Processing Systems, 2017, vol. 30. Retrieved from https://papers.neurips.cc/paper/7181-attention-is-all-you-need.pdf.

Ankita Pasad, et al. 2021. "Layer-Wise Analysis of a Self-Supervised Speech Representation Model." In 2021 IEEE Automatic Speech Recognition and Understanding Workshop (ASRU), pp. 914-921. Retrieved from https://arxiv.org/abs/2211.03929v3.

Rico Sennrich, et al. 2016. "Neural Machine Translation of Rare Words with Subword Units." Proc. the 54th Annual Meeting of the Association for Computational Linguistics (vol. 1: Long Papers), pp. 1715-1725.

Vasileios Papadourakis, et al. 2021. "Phonetically Induced Subwords for End-to-End Speech Recognition." Proc. Interspeech 2021, pp. 1992-1996.

* cited by examiner

FIG. 1C

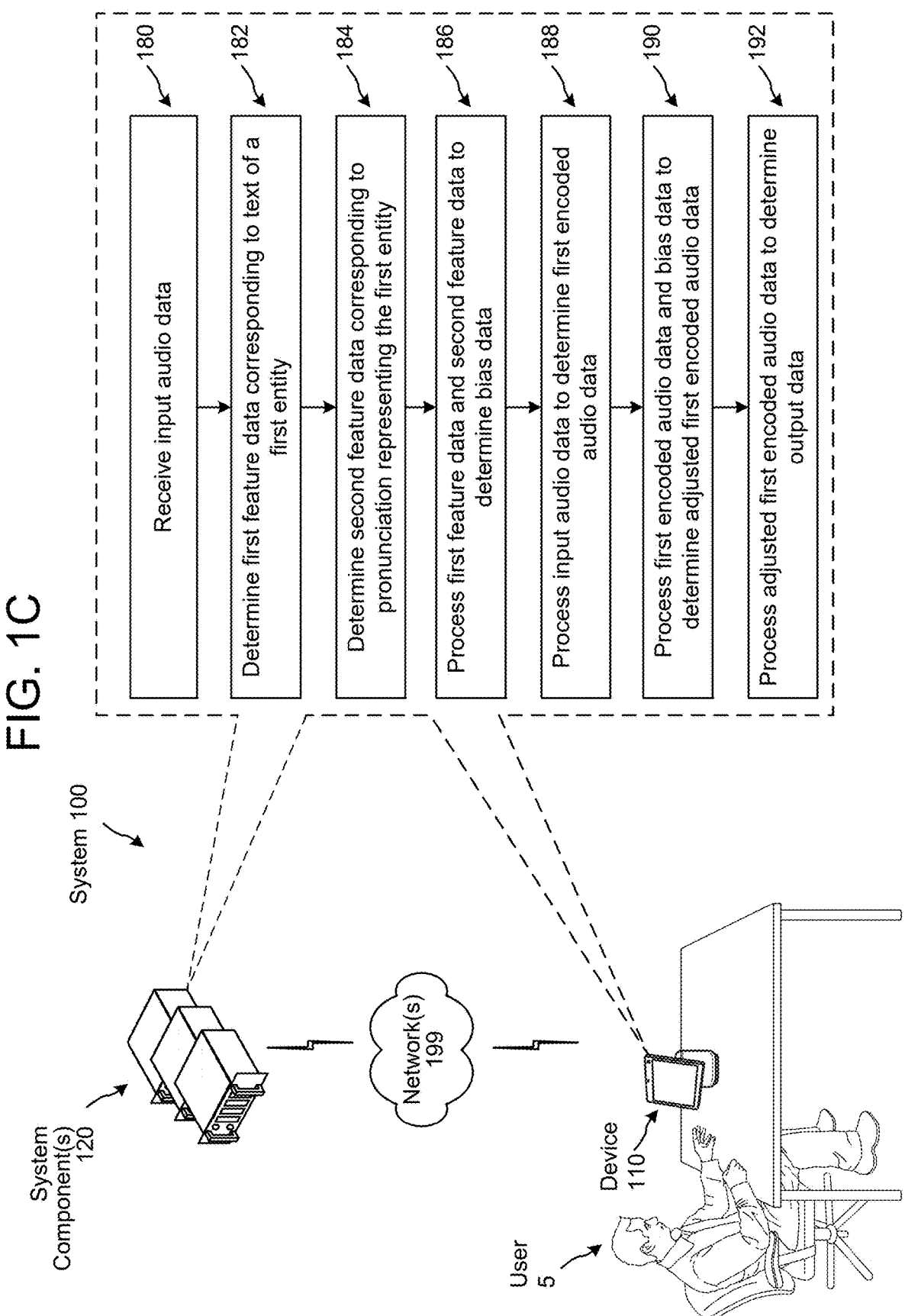

180 Receive input audio data

182 Determine first feature data corresponding to text of a first entity

184 Determine second feature data corresponding to pronunciation representing the first entity 186 Process first feature data and second feature data to determine bias data 188 Process input audio data to determine first encoded audio data 190 Process first encoded audio data and bias data to determine adjusted first encoded audio data 192 Process adjusted first encoded audio data to determine output data System 100

System Component(s) 120

Network(s) 199

Device 110

User 5

Figure 5:
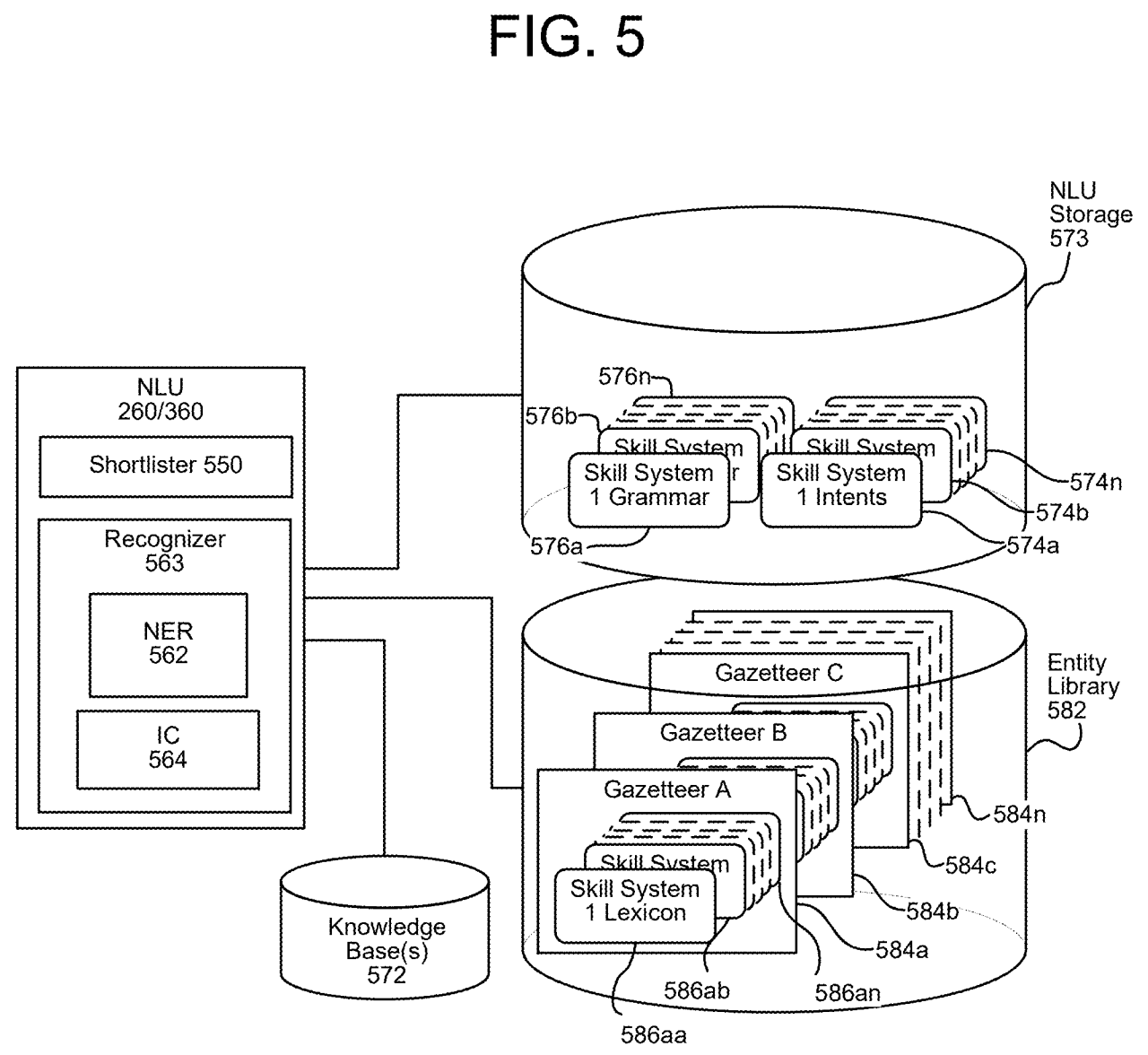

NLU Storage 573

574n
574b
574a

Skill System
Skill System
1 Intents 576n
576b
576a

Skill System r
Skill System 1 Grammar

Entity Library 582

584n
584c
584b
584a

Gazetteer C
Gazetteer B
Gazetteer A

586an
586ab
586aa

Skill System
Skill System 1 Lexicon

Knowledge Base(s) 572

NLU 260/360

Shortlister 550

Recognizer 563

NER 562

AUTOMATIC SPEECH RECOGNITION

CROSS-REFERENCE TO RELATED APPLICATION

This application claims the benefit of priority under 35 U.S.C. § 119(e) of U.S. Provisional Patent Application No. 63/484,034, filed Feb. 9, 2023 and entitled "AUTOMATIC SPEECH RECOGNITION", the entire contents of which is incorporated herein by reference for all purposes.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1C is a conceptual diagram illustrating a virtual assistant system for performing natural language processing including ASR, according to embodiments of the present disclosure.

FIG. 1E is a conceptual diagram of components for performing ASR using neural networks, according to embodiments of the present disclosure.

FIG. 4 is a conceptual diagram of an ASR component, according to embodiments of the present disclosure.

FIG. 5 is a conceptual diagram of how natural language processing is performed, according to embodiments of the present disclosure.

FIG. 7 is a block diagram conceptually illustrating example components of a device, according to embodiments of the present disclosure.

DETAILED DESCRIPTION

Figure 1A:
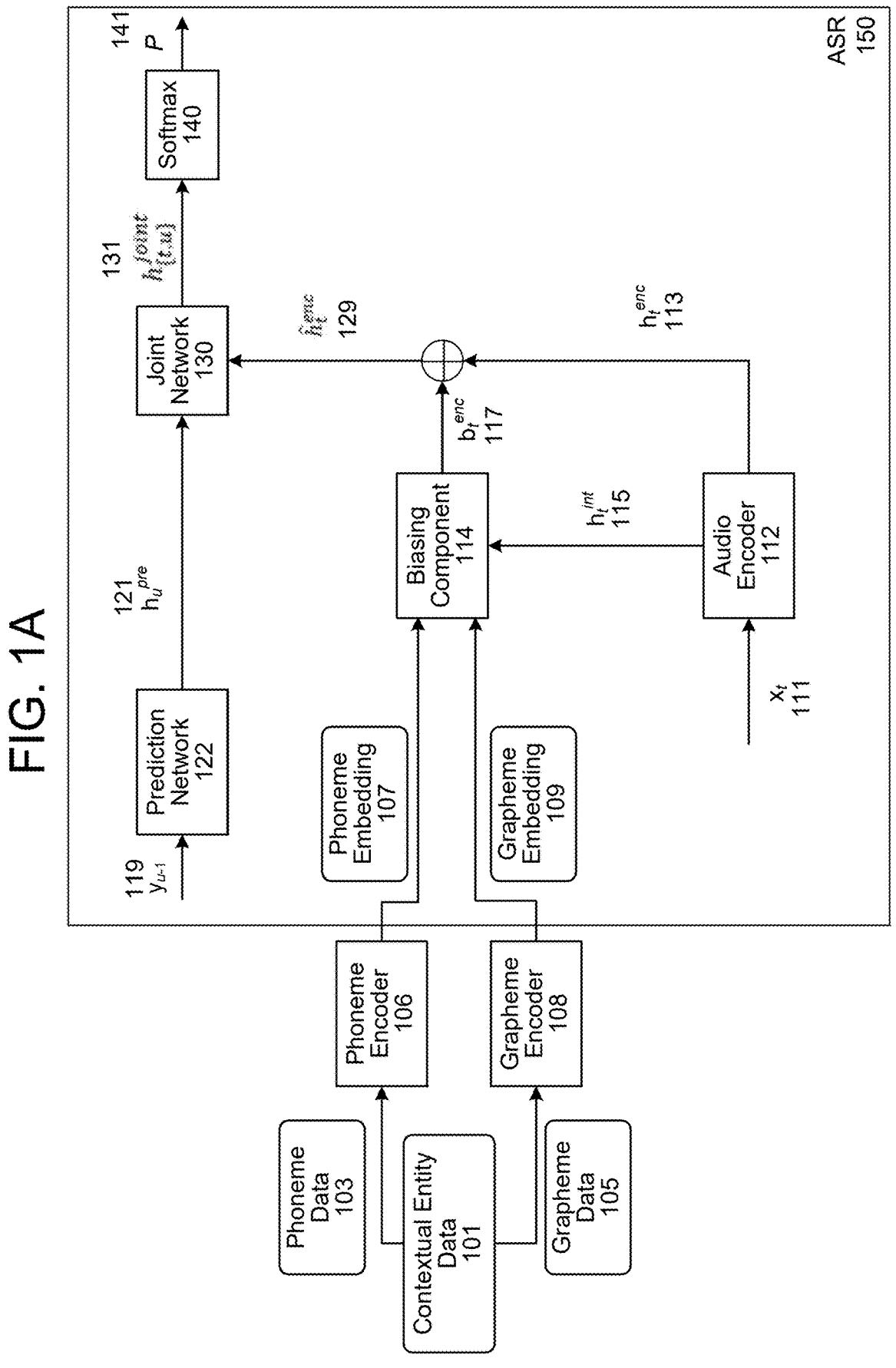
FIG. 1A is a conceptual diagram of components for performing automatic speech recognition (ASR) using neural networks, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). Text-to-speech (TTS), also known as speech synthesis, is a field of computer science concerning transforming textual and/or other data into audio data that is synthesized to resemble human speech. Natural language generation (NLG) is a field of artificial intelligence concerned with automatically transforming data into natural language (e.g., English, Spanish, etc.) content. ASR, NLU, TTS, and/or NLG are can be used together as part of a language processing component of a speech-processing system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Certain systems use end-to-end (E2E) ASR to determine text data, token data, or the like to represent a transcription of an incoming utterance. Such E2E systems may rely on machine learning components, such as neural networks, to process data representing audio into data representing the transcription of the audio. Such E2E ASR systems/components can be trained and configured so that they may be used across a wide variety of devices and with many different users, thus potentially reducing individualized training and customization which may be resource intensive. Thus, one benefit of such approaches can include improved accuracy and more efficient (e.g., reduced) use of computing resources during both training and inference/runtime operations.

To improve the operation and customization of such E2E systems, offered are techniques and components to incorporate contextual information into runtime ASR processing. Such improvements may improve the ability of the E2E ASR component to recognize words that may appear infrequently in training data used to configure the E2E ASR components, such as proper names (such as from personalized entity lists, user-defined personalized device names, or the like as described below) or other words that may be specific to certain users. Information related to entities that are associated with a particular user and/or context of a specific utterance can be used to bias E2E ASR operations. For example, information representing the text of an entity (e.g., the text of the entity name) can be encoded to determine data representing a first set of features corresponding to text representing the entity. Information representing the pronunciation of the entity (e.g., the pronunciation of the entity name) can also or instead be encoded to determine data representing a second set of features corresponding to the pronunciation representing the entity. Those feature data may then be processed to determine weights to be applied to data determined by an audio encoder. The data determined by the audio encoder may be taken from intermediate layers, for example from an audio encoder that uses a multi-layer neural network (NN). The resulting weighted data may be processed to determine a bias vector which is then applied to encoded audio data (for example, output from a last layer of the audio encoder NN) to determine adjusted encoded audio data. The adjusted encoded audio data can then be processed by an E2E architecture to perform ASR processing. The result is the E2E components processing audio data that has been adjusted/biased in view of textual/pronunciation information customized for the user/context of the incoming utterance. As a result, the system may arrive at ASR results that incorporate personalized information without having to reconfigure/retrain E2E ASR components.

FIG. 1A is a conceptual diagram of components of an ASR component 150 for performing E2E ASR using neural networks, according to embodiments of the present disclosure. The ASR component 150 may be included in a local user device 110 and/or a remote system 120 such as those illustrated in FIG. 1C, discussed below. In standard E2E ASR processing, the ASR component 150 may include, for example, a recurrent neural network such as a recurrent neural network transducer (RNN-T). In such a configuration the ASR component 150 may predict a probability (y|x) of labels y=(y_0, . . . , y_u) given acoustic features x=(x_0, . . . , x_t) taken from audio data 111. The labels y may correspond to tokens representing text segments (e.g., graphemes, letters, word segments, words, etc.) that correspond to the predicted transcript of the audio (e.g., speech) represented by the input audio data 111. During inference, the ASR component 150 can generate an N-best list using, for example, a beam search decoding algorithm. A traditional E2E ASR model 150 may include an encoder 112, a prediction network 122, a joint network 130, and a softmax 140.

The audio encoder 112 may be similar or analogous to an acoustic model (e.g., similar to the acoustic model 453 described below), and may process a sequence of acoustic input features to generate encoded hidden representations. The audio encoder 112 may include a number of stacked Long Short-Term Memory (LSTM) layers. Given input audio frames $x_{0,t}=(x_0, \ldots, x_t)$, the audio encoder 112 generates high-level audio encoding representations represented by encoded audio data 113 $h_t^{enc}$.

The prediction network 122 may be similar or analogous to a language model (e.g., similar to the language model 454 described below), and may process the previous output label predictions, and map them to corresponding hidden representations. The prediction network 122 may also use stacked LSTM layers to encoded the last non-blank word pieces 119 $y_{0,u-1}=(y_0, \ldots, y_{u-1})$ and generate prediction data 121 $h_u^{pre}$.

The joint network 130 may be, for example, a feed forward neural network (NN) that may process hidden representations from both the encoder 112 and prediction network 122, and predict output label probabilities. The joint network 130 takes the encoded audio data 113 $h_t^{enc}$ and the prediction data 121 $h_u^{pre}$.

It fuses the two outputs before passing them to a series of dense layers (denoted by φ) to output predicted probabilities $h_{(t,u)}^{joint}$ 131.

The softmax 140 may be a function implemented (e.g., as a layer of the joint network 130) to normalize the predicted output probabilities to ultimately output probability data P 141. The softmax operation is applied to obtain the probability distribution (e.g., P 141) over word pieces. The RNN-T outputs probability at time/given a sequence u of:

$$h_{(t,u)}^{joint} = \phi(JoinOp(h_t^{enc}, h_u^{pre}))$$

$$P(y_u \mid t, u) = \text{softmax}(h_{(t,u)}^{joint})$$

Thus the output probability data P 141 may include a distribution of probabilities corresponding to the potential output ASR data representing the transcription of the input audio.

The present disclosure offers several adjustments to a traditional E2E ASR architecture by adding in a biasing component 114 and related processing. The biasing component 114 may be used to determine bias data (e.g., $b_t^{enc}$, 117)

that is applied to the output (e.g., $h_t^{enc}$, 113)

of the audio encoder 112 to determine adjusted encoded audio data. The bias data includes one or more values (which may be considered weight values) that are configured to be applied to (through addition, multiplication, or other mathematical operation) to other vector(s) to adjust one or more values of the other vector(s). The resulting adjustments are then more indicative of the factors that went into determining the bias data, e.g., more indicative of the contextual situation corresponding to the entities potentially invoked in an utterance to be processed. The adjusted encoded audio data $$\left(e.g., \hat{h}_t^{enc}, 129\right)$$

may be used by the joint network 130 instead of $$h_t^{enc} \ 113.$$

In this way, the E2E ASR processing may be biased without the need for reconfiguring other components of the E2E ASR processing architecture. That is, in certain embodiments, the prediction network 122, joint network 130, encoder 112, and softmax 140 may be the same as such components in a previous E2E ASR processing architecture. Thus the biasing component 114 may be incorporated into the ASR component 150 without altering the operation/configuration of the prediction network 122, joint network 130, encoder 112, and softmax 140 (and/or other components). This will allow these components E2E ASR processing architecture to be trained in a general manner using a large lexicon but still operate at inference in a manner where information related to words that are outside such a lexicon to be considered, through the operations of the biasing component 114 and related data as described herein.

The biasing component 114 may include a jointly-trained contextualization adapter for the RNN-T model E2E ASR configuration. The biasing component 114 incorporates both textual (graphemic) and pronunciation (phonemic) representations of contextual entities (e.g., entities that may relate to an input utterance) to create a pronunciation-aware contextual adapter (e.g., the biasing component 114) that may create biasing data that will incorporate some information about the contextual entities and thus bias the ultimate ASR results in a way that uses this information.

Input audio data 111 (represented by $x_t$ in FIG. 1A) is received by the ASR component 150 and processed by the audio encoder 112. Audio data 111 may be in the form of raw audio data, such as that determined by one or more microphones (e.g., microphones 720 discussed below), an audio feature vector, for example as determined by an acoustic front end (AFE) or other component, or other form of audio data. The audio encoder 112 processes the audio data 111 to determine encoded audio data 113, represented by $$h_t^{enc}$$

as shown in FIG. 1A. Thus, for audio frame/(represented by $x_t$) the audio encoder 112 may determine $$h_t^{enc}.$$

The processing system (e.g., device 110, system component(s) 120, and/or another device/component) may determine one or more contextual entities that correspond to the input audio data 111. This determination is discussed further below in reference to the context selector 470 illustrated in FIG. 4. The determine contextual entities are represented by contextual entity data 101, which may also be represented as $c_1, \ldots, c_M$ for contextual entity $c_1$ through $c_M$, where there are M contextual entities for the particular inference task (e.g., ASR processing for certain input audio data). Each entity may be associated with particular pronunciation data representing a pronunciation associated with the entity (e.g., representing the pronunciation of the entity name). Such pronunciation data may be represented by phoneme data 103, which represents the individual phonemes of the names of the contextual entities. Such phoneme data 103 may also be represented as $p_1, \ldots, p_M$ with M pronunciations for the contextual entities. For illustration purposes, only phoneme related data will be discussed herein, though as can be appreciated other pronunciation data may be used in addition to and/or instead of phoneme data. Each entity may also be associated with particular textual data representing the entity (e.g., representing the text of the entity name). Such text data may include data corresponding to the text of the entity name and may include data such as a token representation of a particular word/meaning, data representing segment(s) of an entity name, data specific to the particular entity spelling, etc. Such text data may be represented by grapheme data 105, which represents the individual graphemes of the names of the contextual entities. Such grapheme data 105 may also be represented as $g_1, \ldots, g_K$ with K different textual representations for the contextual entities. For illustration purposes, only grapheme related data will be discussed herein, though as can be appreciated other text data may be used in addition to and/or instead of grapheme data.

As can be appreciated, two different entities may share a grapheme representation but have a different phoneme representation. For example, one person named "Nina" may pronounce her name <nee-nah> while another person named "Nina" may pronounce her name <nye-nah>. Similarly, two different entities may share a phoneme representation but have a different grapheme representation. For example, one person may pronounce their name <jo> but spell it "Jo" while another person may spell it "Joe." Thus, K may not necessarily be the same number as M.

The system may encode the entity textual and/or pronunciation data 103/105 to determine encoded/embedded data that may be used by the biasing component 114. For example, a phoneme encoder 106 may be used to encode phoneme data 103 into phoneme embedding data 107. Let $P=[p_1, p_2 \ldots, p_M]$ denote all pronunciations (e.g., phoneme sequences) of catalog entities $C=[c_1, c_2 \ldots, c_k]$ where M≥K. The phoneme encoder 106 may embed the phoneme sequences using an embedding lookup, followed by a stack of Bidirectional Long Short-Term Memory (BiLSTM) layers. With M pronunciations and an embedding size of $D_p$, the phoneme encoder 106 may output $$P^{emb} \in \mathbb{R}^{M \times D_p} \text{ where } P_m^{emb} \subset P^{emb}$$

is the phoneme embedding of pronunciation $p_m$, calculated as:

$$p_j^{emb} = BiLSTM(Embedding(p_j))$$

A no_bias token may be added to the pronunciation catalog to disable adapter biasing during certain operations depending on system configuration.

The grapheme encoder 108 may encode the grapheme representation $G=[g_1, g_2 \ldots, g_K]$ of catalog entities $C=[c_1, c_2 \ldots, c_k]$ by passing them to a subword tokenizer followed by a stack of BiLSTM layers. The last state of the BiLSTM is used as the embedding of the contextual entity, which is an encoded representation $c_e$. Given a catalog with K entities, and the generated entity embedding size of D, the grapheme encoder 108 may output $$C^e \in \mathbb{R}^{KxD}$$

as follows:

$$c_i^e = BiLSTM(Embedding(c_i))$$

The grapheme encoder 108 may also duplicate the output grapheme embeddings for the entities with more than one pronunciation to match with the phoneme embeddings for the various pronunciations of a given entity. Thus, given a total of M pronunciations and grapheme embedding size $D_g$, the grapheme encoder 108 may output $$G^{emb} \in \mathbb{R}^{MxD_g} \text{ where } g_m^{emb} \subset G^{emb}$$

is the grapheme embedding of the textual representation in the catalog with $p_m$ as one of its pronunciations.

Thus, for a specific entity m whose pronunciation/phoneme data 103 is represented by $p_m$ and whose textual/grapheme data 105 is represented by $g_m$, its phoneme embedding 107 may be represented by $$p_m^{emb}$$

and its grapheme embedding 109 may be represented by $$g_m^{emb}.$$

The biasing component 114 may receive the phoneme embedding data 107 and the grapheme embedding 109 and may process that data along with encoded audio data to determine the bias data $$117 \ b_t^{enc}$$

that will be used to create adjusted encoded audio data that will ultimately be passed to the joint network 130. The encoded audio data passed to the biasing component 114 may take a number of forms. In certain system configurations, the encoded audio data is interim encoded audio data 115 represented by $$h_t^{int}$$

as shown in FIG. 1A.

The output of the biasing component 114 thus may be used to transform an intermediate representation computed by the RNN-T, such as the audio encoder output $$113 \ h_t^{enc}$$

using the entity embedding data from an entity catalog. The biasing component 114 may use a cross-attention based biasing adapter to attend over entity embeddings $C^e$ (key and value) based on $$h_t^{enc}$$

at the input query. The attention scores $\alpha_i$ for catalog entities are calculated using a scaled dot-product attention mechanism. The biased intermediate representation, also referred to as a bias vector/bias data $$117 \ b_t^{enc}$$

is calculated as:

$$b_t^{enc} = \sum_i^K \alpha_i W^v c_i^e$$

The audio encoder output $$113 \ h_t^{enc}$$

may be updated with the bias vector using element-wise addition. Thus, the contextual audio encoding $$129 \ \hat{h}_r^{enc}$$

that includes the biased representation may be calculated as $$\hat{h}_t^{enc} = h_t^{enc} \oplus b_t^{enc}.$$

Figure 1B:
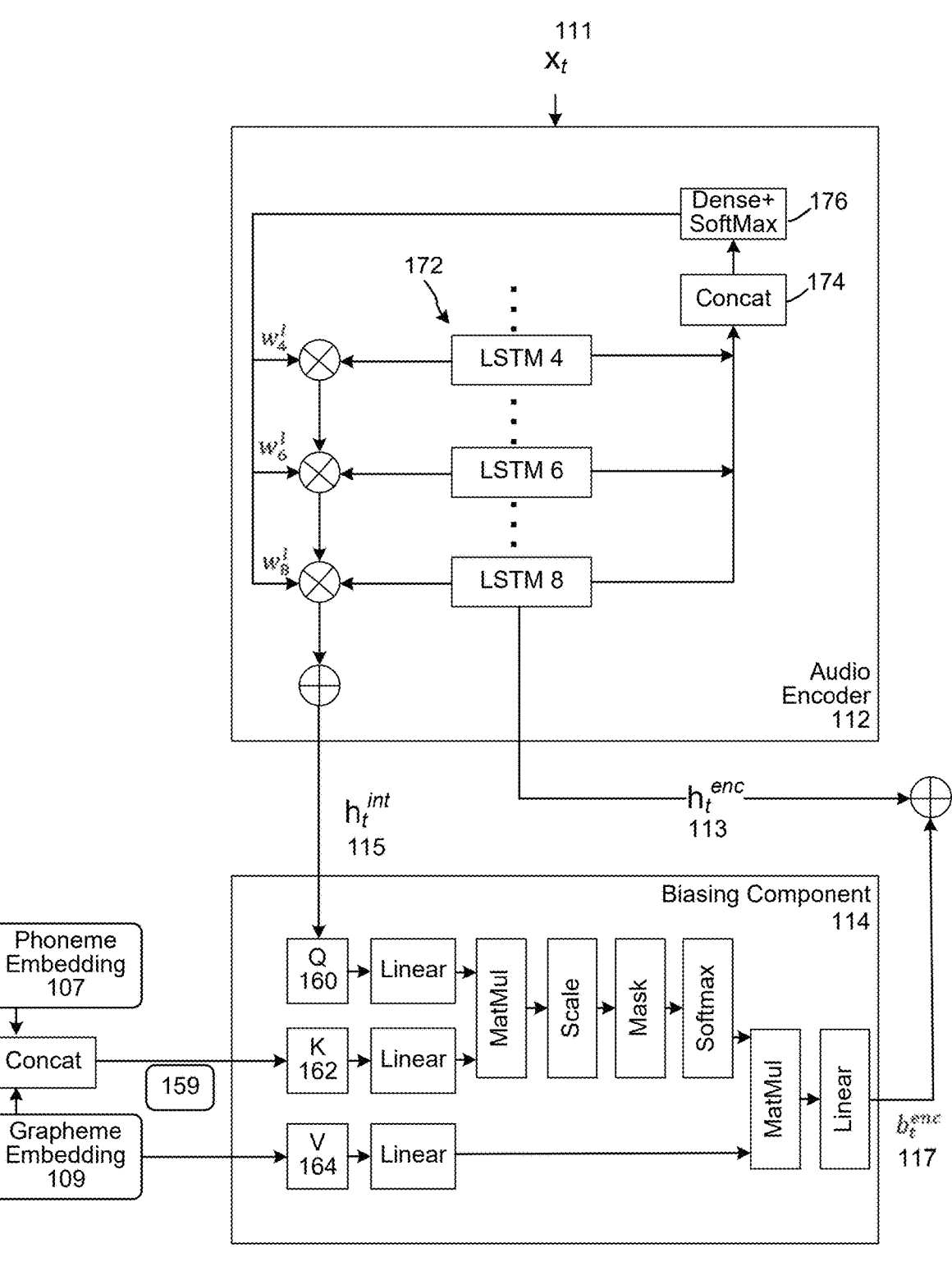
FIG. 1B is a conceptual diagram of components for performing automatic speech recognition (ASR) using neural networks, according to embodiments of the present disclosure.

Determination of the bias data $$117 \ b_t^{enc}$$

and the interim encoded audio data $$115 \ h_t^{int}$$

is discussed below in reference to FIG. 1B. As shown, the biasing component 114 adapts an intermediate representation from the audio encoder 112 with both textual and pronunciation representations (e.g., 107 and 109) of contextual catalog entities. The biasing component 114 uses a cross-attention module using the scaled dot product of interim audio data. The cross-attention module of the biasing component 114 uses a query, key, and value structure (as known in the art) using specific input data as offered herein.

The input to the query component 160 comes from data output by intermediate layers of the audio encoder 112. As shown in FIG. 1B, the audio encoder 112 may receive input audio data 111. As noted above, the audio data 111 may be processed by a series of LSTM layers 172. Each of the intermediate layers may output interim encoded audio data, with the output of the final of these layers (LSTM 8) being $$h_t^{enc} \text{ 113}$$

as shown in FIG. 1A. As can be appreciated, as the layers of the audio encoder 112 perform processing, the resulting data output by each successive layer may include less information related to the audio and more data related to the text. Thus, data from intermediate layers may be used to obtain representations that include varying degrees of acoustic versus textual representations. Thus, first interim encoded audio data may be output by a first layer (e.g., LSTM 4 whose output data may be referred to as $$h_t^{enc^4}),$$

second interim encoded audio data may be output by a second layer (e.g., LSTM 6 whose output data may be referred to as $$h_t^{enc^6}),$$

and final encoded audio data $$(h_t^{enc} \text{ 113})$$

may be output by LSTM 8. The respective data output by these layers may be concatenated together by a concatenation component 174. It should be appreciated that output from different layers may also be used. For example, the output from layers 2, 5, and 7 may be used. Or the output from just layers 6 and 8 may be used. Various such configurations are possible.

A Dense layer 176 may be used to project the concatenated layer outputs $$\{h_t^{enc^4}, h_t^{enc^6}, h_t^{enc}\}$$

to a three dimensional vector to determine weights corresponding to each layer, $$[w_4^i, w_6^i, w_8^i].$$

These weights are used to calculate the final weighted sum of encodes output 115

$$h_t^{int}$$

(which is used as the input to the query component 160 of the biasing component 114) as follows:

$$h_t^{enc^{cat}} = Concat(\{h_t^{enc^4}, h_t^{enc^6}, h_t^{enc}\})$$

$$[w_4^i, w_6^i, w_8^i] = \text{Softmax}(\text{Dense}(h_t^{enc^{cat}}))$$

$$h_t^{int} = \sum_{i \in \{4,6,8\}} w_i^i h_t^{enc^i}$$

The key of the cross-attention aspects of the biasing component 114 is used to compute the attention score based on the provided query. The key uses both textual and pronunciation representations (coming from the grapheme and phoneme encoders respectively) as the key. As shown, the phoneme embedding 107 and the grapheme embedding 109 are sent to a concatenation component which concatenates those embeddings for the final embedding for the key. For each entity catalog grapheme-phoneme embedding pair $$g_m^{emb}$$

and $$p_m^{emb}$$

where m ∈ 1, . . . , M, an individual input $$c_m^{key}$$

139 (for entity m) to the key component 162 is computed as:

$$c_m^{key} = Concat(g_m^{emb}, p_m^{emb})$$

Thus, for all grapheme-phoneme embedding pairs of a group of M contextual entities (that is, all entities considered part of the context for an utterance being processed), the input 159 to key component 162 becomes $$C^{key} = [c_1^{key}, c_2^{key}, \dots, c_m^{key}].$$

The input 159 can thus include $C^{key}$ for all entities 1 through M where M entities are considered contextual entities (for example as selected by context selector 470 described below) for the present audio/utterance being processed by ASR component 150.

The value of the cross-attention aspects of the biasing component 114 is used to bias the query with the computed attention weights. As the biased vector ultimately passed to the joint network 130 of the RNN-T is expected to contain only textual information, the textual representation/grapheme embedding $$g_m^{emb}$$

109 is used as the input to the value component 164.

The biasing component 114 thus uses the illustrated components in FIG. 1B to compute an attention score $\alpha_i$ based on the weighted sum of intermediate encoder outputs as query and concatenated grapheme-phoneme representations of all contextual entities as the key as follows:

$$\alpha_i = Softmax_i\left(\frac{W^q h_t^{int} \cdot \left(W^k C^{key}\right)^T}{\sqrt{d}}\right)$$

where d is the dimensionality, $W^q$ are the weights for the intermediate layers of the audio encoder 112 (e.g., $$\left[w_4^l, w_6^l, w_8^l\right]$$

and $W^k$ is a projection matrix for the key allowing multiplication by intermediate layers of audio data. The final bias vector $$b_t^{enc} \ 117$$

is calculated as:

$$b_t^{enc} = \sum_i^K \alpha_i W^v g_i^{emb}$$

The data of the bias vector $$b_t^{enc} \ 117$$

is then combined (as shown in FIG. 1A) with the encoded audio data $$h_t^{enc} \ 113$$

using element-wise addition to determine adjusted encoded audio data $$\hat{h}_t^{enc} \ 129,$$

calculated as $$\hat{h}_t^{enc} = h_t^{enc} \oplus b_t^{enc}.$$

The adjusted encoded audio data $$\hat{h}_t^{enc} \ 129,$$

which is now biased using information related to the contextual entities (through the bias vector $$b_t^{enc} \ 117$$

as determined by the biasing component 114 as described herein), is then input into the joint network 130 for purposes of determining the distribution data 141 representing the predicted transcription of the input audio data 111.

In this way a system may use existing RNN-T components (e.g., prediction network 122, joint network 130, audio encoder 112, and softmax 140) with a new component (e.g., biasing component 114) that is configured to incorporate pronunciation and textual information about entities considered to be relevant to the context of a particular utterance represented by audio data (e.g., audio data 111) being processed by ASR component 150.

FIG. 1C is a conceptual diagram illustrating a virtual assistant system 100 for natural language processing which may perform natural language processing (including ASR) using components described herein, such as those described above in reference to FIGS. 1A and 1B and those described below. As shown in FIG. 1C, the virtual assistant system 100 may include a voice-enabled device 110 local to a user 5, a natural language command processing system 120 (components of which are referred to as "system component(s) 120"), and one or more skill system component(s) 225 (shown in FIG. 2) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may process audio following detection of a wakeword (described below). The device 110 may generate audio data corresponding to the audio, and may send the audio data to the system component(s) 120. The device 110 may send the audio data to the system component(s) 120 via an application that is installed on the device 110 and associated with the system component(s) 120. An example of such an application is the Amazon Alexa application that may be installed on a smart phone, tablet, or the like. In some implementations, the device 110 may receive text data 213 corresponding to a natural language input originating from the user 5, and send the text data to the system component(s) 120. The device 110 may also receive output data from the system component(s) 120, and generate a synthesized speech output. The device 110 may include a camera for capturing image and/or video data for processing by the system component(s) 120. Examples of various devices 110 are further illustrated in FIG. 9. The system component(s) 120 may be remote system such as a group of computing components located geographically remote from device 110 but accessible via network 199 (for example, servers accessible via the internet). The system component(s) 120 may also correspond to system components that are physically separate from device 110 but located geographically close to device 110 and accessible via network 199 (for example a home server located in a same residence as device 110. System component(s) 120 may also include some combination thereof, for example where certain components/operations are performed via a home server(s) and others are performed via a geographically remote server(s).

The system 100 (through device 110 and/or system component(s) 120) may perform processing such as that described above in reference to FIGS. 1A and 1B. The system may receive (180) input audio data representing an utterance. For example, a device 110 may detect audio and determine audio data 111 representing the audio. The audio data 111 may be sent to an ASR component 150, for example on device 110 and/or on system component(s) 120. The system 100 may determine one or more entities relevant to the context of the particular audio data 111, for example using context selector 470 described in detail below. For example, the system 100 may determine that one or more entities may be associated with a user profile of a user who spoke the utterance, for example such entities may be contacts of a user, word(s)/name(s) associated with skills/applications installed by the user, family member(s) of the user, smart home device(s) of the user, or the like. The system 100 may determine contextual entity data 101 related to the one or more entities. Such contextual entity data 101 may include text data (e.g., grapheme data 105) related to the one or more entities. Such contextual entity data 101 may also include pronunciation data (e.g., phoneme data 103) related to the one or more entities. Such contextual entity data 101 may be retrieved from a catalog of entity data available to the system 100.

The system may determine (182) first feature data corresponding to text of a first entity. For example, the system 100 may process text data (e.g., grapheme data 105), for example using grapheme encoder 108 to determine grapheme embedding data 109, which may be the first feature data. The first feature data may include grapheme/text embedding data for a single entity or for a plurality of entities (e.g., for all or a subset of entities determined to be potentially related to the context of the audio data 111 being processed). The first feature data may thus include a first feature vector representing a plurality of graphemes associated with a name of the first entity. The system may determine (184) second feature data corresponding to pronunciation representing the first entity. For example, the system 100 may process pronunciation data (e.g., phoneme data 103), for example using phoneme encoder 106 to determine phoneme embedding data 107, which may be the second feature data. The second feature data may include phoneme/pronunciation embedding data for a single entity or for a plurality of entities (e.g., for all or a subset of entities determined to be potentially related to the context of the audio data 111 being processed). The second feature data may thus include a second feature vector representing a plurality of phonemes associated with pronunciation of the name of the first entity. The system may repeat steps 182 and 184 for a plurality of entities potentially related to the input audio data 111.

The respective embedding data (e.g., 107 and/or 109) for a particular entity may be determined at runtime (e.g., as part of processing particular audio data 111) and/or may be retrieved from an entity catalog, which may store entity embedding data. The embedding data for the group of potentially relevant entities may then be gathered and used as the respective embedding data (e.g., 107 and/or 109) for purposes of processing herein.

The system 100 may process (186) the first feature data and second feature data (and potentially more feature data related to other entities) to determine bias data. Determination of the bias data may include the operations discussed herein to determine the bias vector $$b_t^{enc} \; \textbf{117}.$$

This may include processing data 107 and data 109 (either separately or in concatenated form 159) by biasing component 114 to determine the values of the bias vector $$b_t^{enc} \; \textbf{117}.$$

This may also include processing, by the biasing component 114, interim audio data $$h_t^{int} \textbf{115}$$

as described herein. The system may process (188) input audio data to determine first encoded audio data. This may include processing input audio data 111 by audio encoder 112 to determine encoded audio data $$h_t^{enc} \textbf{113}.$$

The system may process (190) the first encoded audio data and the bias data to determine adjusted first encoded audio data. This may include applying the bias data $$b_t^{enc} \textbf{117}$$

to the encoded audio data $$h_t^{enc} \textbf{113}$$

to determine $$\hat{h}_t^{enc} \textbf{129}$$

according to the calculation $$\hat{h}_t^{enc} = h_t^{enc} \oplus b_t^{enc}.$$

The system may then process (192) the first encoded audio data to determine output data. This may include a joint network 130 processing first (e.g., adjusted) encoded audio data $$\hat{h}_t^{enc} \textbf{129}$$

(along with the output $$h_u^{pre} 121$$

from the prediction network 122) to determine predicted probabilities $$h_{\{t,u\}}^{joint} 131$$

and ultimately the normalized distribution P 141 and potentially ASR data 410 (discussed below) which may represent a transcription of the input utterance.

The above operations described in reference to FIGS. 1A and 1C indicate that the biasing component 114 can be used to create a bias vector $$b_t^{enc} 117$$

that will be combined with encoded audio data $$h_t^{enc} 113$$

output from the audio encoder 112 to determine adjusted encoded audio data $$\hat{h}_t^{enc} 129.$$

Figure 1D:
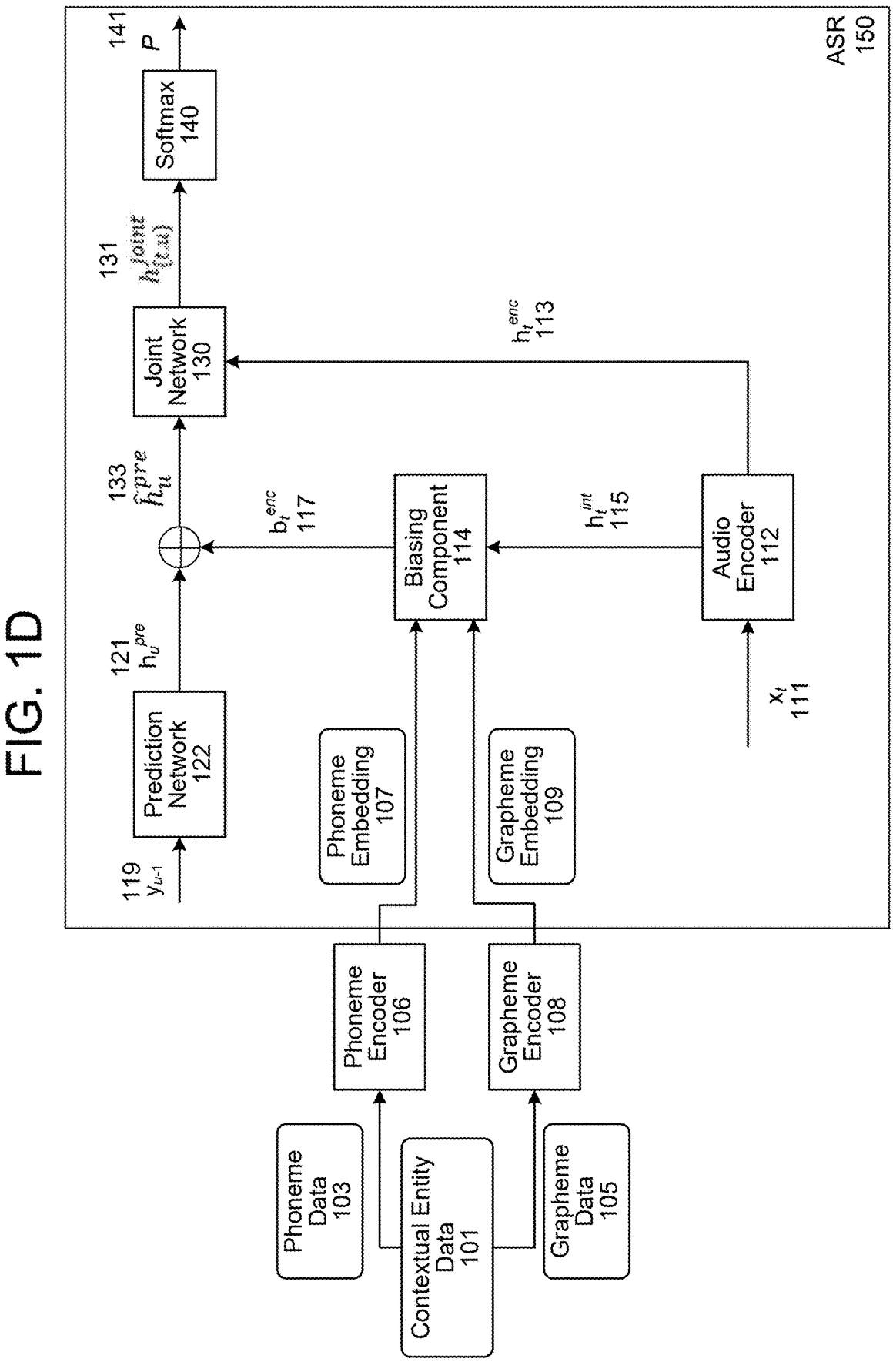
FIG. 1D is a conceptual diagram of components for performing ASR using neural networks, according to embodiments of the present disclosure.

However, in certain configurations the bias vector $$b_t^{enc} 117$$

may, additionally or in the alternative, be applied to predicted probabilities $$h_u^{pre} 121$$

output from prediction network 122. For example, as shown in FIG. 1D, the bias vector $$b_t^{enc} 117$$

is applied to predicted probabilities $$h_u^{pre} 121$$

to determine adjusted probabilities $$\hat{h}_u^{pre} 133,$$

for example, as $$\hat{h}_u^{pre} = h_u^{pre} \oplus b_t^{enc}.$$

The adjusted probabilities datal $$\hat{h}_u^{pre} 133$$

are then fed into the joint network 130 along with encoded audio data $$h_t^{enc} 113$$

to ultimately determine the predicted probabilities $$h_{\{t,u\}}^{joint} 131.$$

In this way it is the predicted probabilities that are biased using the bias vector $$b_t^{enc} 117$$

rather than the encoded audio datal $$h_t^{enc} 113.$$

In another example, however, the bias vector $$b_t^{enc} 117$$

may be used to bias both the encoded audio data $$h_t^{enc} 113$$

and the predicted probabilities $$h_u^{pre} 121.$$

Figure 1E:
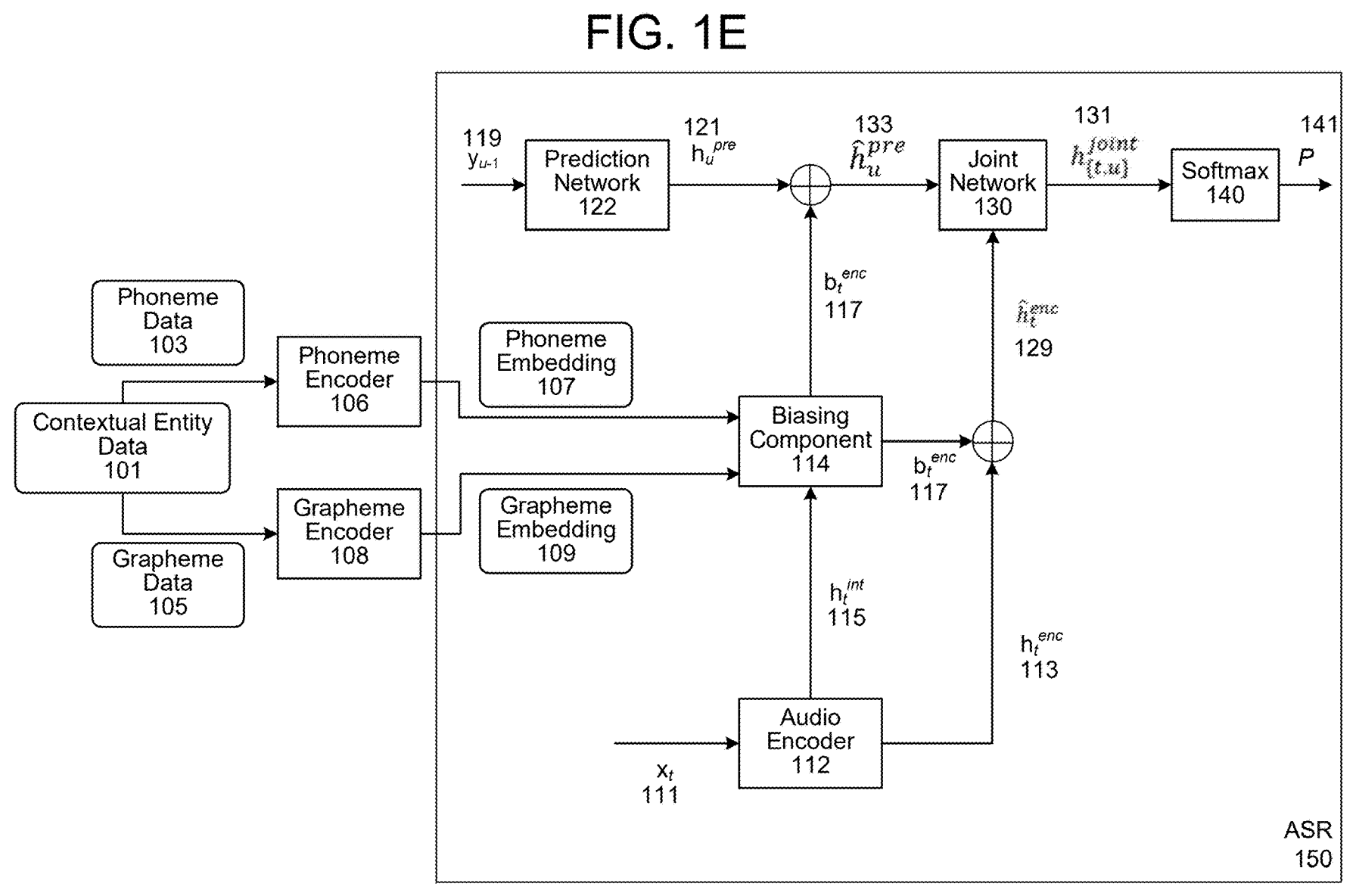

Such a configuration is shown in FIG. 1E. As shown in FIG. 1E, the bias vector $$b_t^{enc} 117$$

is applied to predicted probabilities $$h_u^{pre} 121$$

to determine adjusted probabilities $$\hat{h}_u^{pre} 133.$$

The bias vector $$b_t^{enc} 117$$

is also applied to the encoded audio data $$h_t^{enc} 113$$

to determine the adjusted encoded audio data $$\hat{h}_t^{enc} 129.$$

The adjusted probabilities $$\hat{h}_u^{pre}$$

133 and the adjusted encoded audio data $$\hat{h}_t^{enc} 129$$

are then fed into joint network 130 for processing to determine the predicted probabilities $$h_{\{t,u\}}^{joint} 131.$$

Using either of these architectures, the steps of FIG. 1C may be performed with the bias data being applied to the predicted probabilities (instead of, or in addition to, the bias data being applied to the encoded audio data) to ultimately determine the output data.

Figure 2:
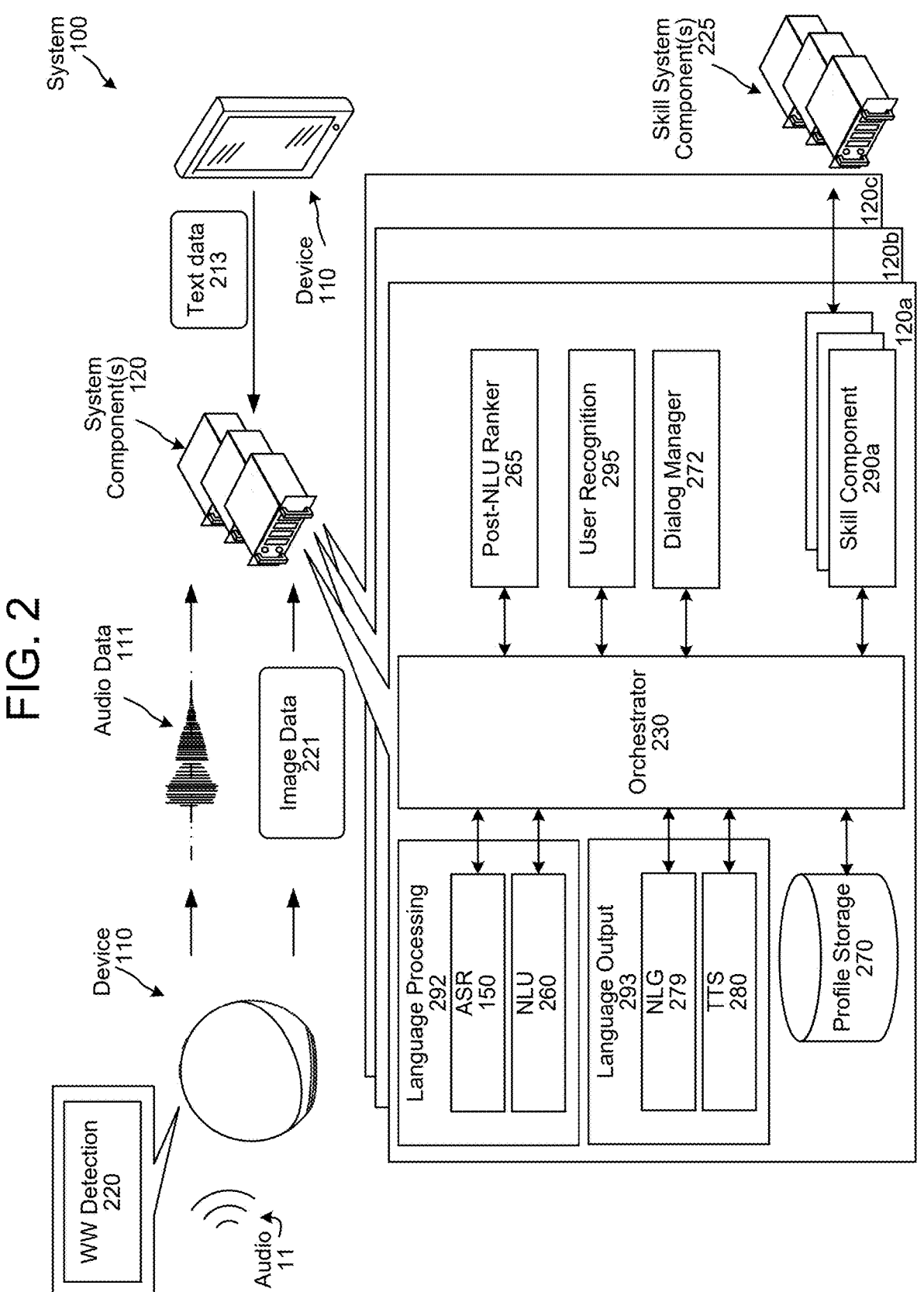
FIG. 2 is a conceptual diagram of components of the system, according to embodiments of the present disclosure.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 718 of the device 110 and may send image data 221 representing those image(s) to the system component(s) 120. The image data 221 may include raw image data or image data processed by the device 110 before sending to the system component(s) 120.

The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 111, representing the audio 11, to the system component(s) 120. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword.

In some implementations, the system 100 may include more than one group of system component(s) 120. The system(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 220 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill(s) 290 of one or more systems 120. Each such system 120 may be associated with a different virtual assistant, where each such assistant may be associated with different user experiences. For example, one virtual assistant may have certain voice characteristics associated with TTS processing and certain personality characteristics associated with natural language generation (NLG), etc.

Upon receipt by the system component(s) 120, the audio data 111 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 111 to a language processing component 292. The language processing component 292 (sometimes also referred to as a spoken language understanding (SLU) component) includes an automatic speech recognition (ASR) component 150 and a natural language understanding (NLU) component 260. The ASR component 150 may transcribe the audio data 111 into text data. The text data output by the ASR component 150 represents one or more than one (e.g., in the form of an N-best list) ASR hypotheses representing speech represented in the audio data 111. The ASR component 150 interprets the speech in the audio data 111 based on a similarity between the audio data 111 and pre-established language models. For example, the ASR component 150 may compare the audio data 111 with models for sounds (e.g., acoustic units such as phonemes, senons, phones, etc.) and sequences of sounds to identify words that match the sequence of sounds of the speech represented in the audio data 111. The ASR component 150 sends the text data generated thereby to an NLU component 260, via, in some embodiments, the orchestrator component 230. The text data sent from the ASR component 150 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 4.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system component(s) 120, a skill component 290, a skill system component(s) 225, etc.) to execute the intent. For example, if the text data corresponds to "play the 5th Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 111 as well as any data received from the other speech processing system 292.

The NLU component 260 may return NLU results data 685/625 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 685/625 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265. The NLU component 260, post-NLU ranker 265 and other components are described in greater detail below with regard to FIGS. 5 and 6.

A skill component may be software running on the system component(s) 120 that is akin to a software application. That is, a skill component 290 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 290. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 290 may operate in conjunction between the system component(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system component(s) 225 may communicate with a skill component(s) 290 within the system component(s) 120 and/or directly with the orchestrator component 230 or with other components. A skill system component(s) 225 may be configured to perform one or more actions. An ability to perform such action(s) may sometimes be referred to as a "skill." That is, a skill may enable a skill system component(s) 225 to execute specific functionality in order to provide data or perform some other action requested by a user. For example, a weather service skill may enable a skill system component(s) 225 to provide weather information to the system component(s) 120, a car service skill may enable a skill system component(s) 225 to book a trip with respect to a taxi or ride sharing service, an order pizza skill may enable a skill system component(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 290 dedicated to interacting with the skill system component(s) 225. Unless expressly stated otherwise, reference to a skill, skill device, or skill component may include a skill component 290 operated by the system component(s) 120 and/or skill operated by the skill system component(s) 225. Moreover, the functionality described herein as a skill or skill may be referred to using many different terms, such as an action, bot, app, or the like. The skill 290 and or skill system component(s) 225 may return output data to the orchestrator 230.

As used herein, a "dialog," "dialog session," "session," or the like refers to various related user inputs and system responses, for example inputs and outputs related to an ongoing exchange between a user and the system.

A dialog may be goal-oriented, meaning the dialog corresponds to the system performing a specific action requested by a user (such as figuring out what music the system should play). Alternatively, a dialog may not be goal-oriented, for example as part of a freeform conversation between the system and a user, where the conversation may not have a definite end point or specifically requested system action. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 272 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system-generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on the system configuration the dialog manager 272 may determine the appropriate system generated response to give to a particular utterance or user input of a turn. Alternatively creation of the system generated response may be managed by another component of the system (e.g., the language output component 293, NLG 279, orchestrator 230, etc.) while the dialog manager 272 selects the appropriate responses. Alternatively, another component of the system component(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager 272 may receive the ASR hypothesis/hypotheses (i.e., text data) and make a semantic interpretation of the phrase(s) or statement(s) represented therein. That is, the dialog manager 272 determines one or more meanings associated with the phrase(s) or statement(s) represented in the text data based on words represented in the text data. The dialog manager 272 determines a goal corresponding to an action that a user desires be performed as well as pieces of the text data that allow a device (e.g., the device 110, the system component(s) 120, a skill 290, a skill support system component(s) 225, etc.) to execute the intent. If, for example, the text data corresponds to "what is the weather," the dialog manager 272 may determine that that the system component(s) 120 is to output weather information associated with a geographic location of the device 110. In another example, if the text data corresponds to "turn off the lights," the dialog manager 272 may determine that the system component(s) 120 is to turn off lights associated with the device(s) 110 or the user(s) 5.

The dialog manager 272 may send the results data to one or more skill component(s) 290. If the results data includes a single hypothesis, the orchestrator component 230 may send the results data to the skill component(s) 290 associated with the hypothesis. If the results data includes an N-best list of hypotheses, the orchestrator component 230 may send the top scoring hypothesis to a skill component(s) 290 associated with the top scoring hypothesis.

The system component(s) 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data). Alternatively or in addition, the TTS component 280 may receive text data from a skill 290 or other system component for output.

The NLG component 279 may include a trained model. The NLG component 279 generates text data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 111 representing the commands to the system component(s) 120 for processing, after which the system component(s) 120 may return output data that can cause the device 110 to engage its camera.

Upon receipt by the system(s) 120, the image data may be sent to an orchestrator component 230. The orchestrator component 230 may send the image data to an image processing component (not shown). The image processing component can perform computer vision functions such as object recognition, modeling, reconstruction, etc. For example, the image processing component may detect a person, face, etc. (which may then be identified using user recognition component 295).

The system(s) 120 and/or device 110 may include a user recognition component 295 that recognizes one or more users using a variety of data.

The user-recognition component 295 may take as input the audio data 111 and/or text data output by the ASR component 150. The user-recognition component 295 may perform user recognition by comparing audio characteristics in the audio data 111 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 3:
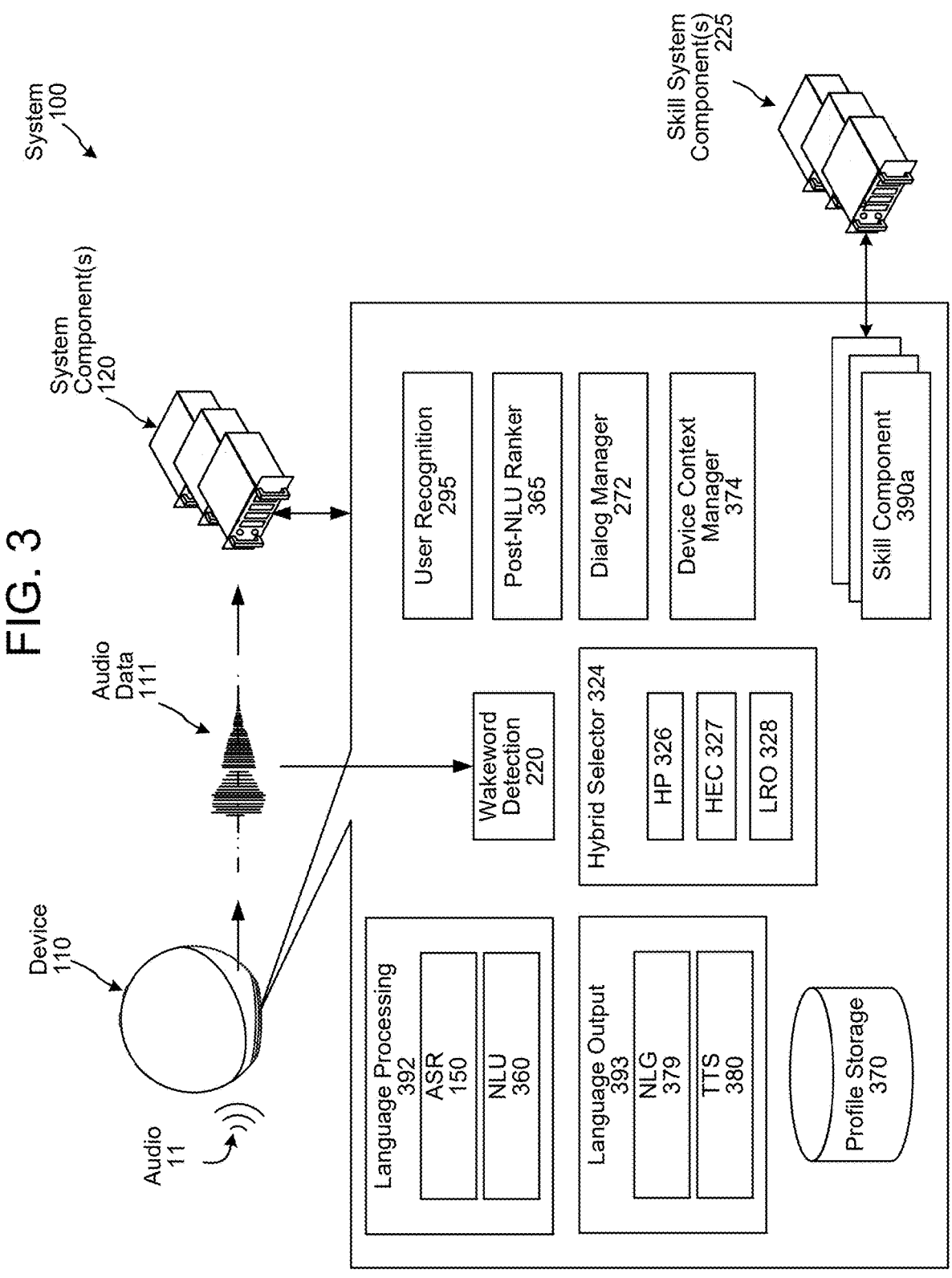
FIG. 3 is a conceptual diagram illustrating components that may be included in a device, according to embodiments of the present disclosure.

Although the components of FIG. 2 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 3 illustrates such a configured device 110.

In at least some embodiments, the system component(s) 120 may receive the audio data 111 from the device 110, to recognize speech corresponding to a spoken input in the received audio data 111, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 324, of the device 110, may send the audio data 111 to the wakeword detection component 220. If the wakeword detection component 220 detects a wakeword in the audio data 111, the wakeword detection component 220 may send an indication of such detection to the hybrid selector 324. In response to receiving the indication, the hybrid selector 324 may send the audio data 111 to the system component(s) 120 and/or the ASR component 150. The wakeword detection component 220 may also send an indication, to the hybrid selector 324, representing a wakeword was not detected. In response to receiving such an indication, the hybrid selector 324 may refrain from sending the audio data 111 to the system component(s) 120, and may prevent the ASR component 150 from further processing the audio data 111. In this situation, the audio data 111 can be discarded.

The device 110 may conduct its own speech processing using on-device language processing components, such as an SLU/language processing component 392 (which may include an ASR component 150 and an NLU 360), similar to the manner discussed herein with respect to the SLU component 292 (or ASR component 150 and the NLU component 260) of the system component(s) 120. Language processing component 392 may operate similarly to language processing component 292 and NLU component 360 may operate similarly to NLU component 260. The device 110 may also internally include, or otherwise have access to, other components such as one or more skill components 390 capable of executing commands based on NLU output data or other results determined by the device 110/system component(s) 120 (which may operate similarly to skill components 290), profile storage 370 (configured to store similar profile data to that discussed herein with respect to the profile storage 270 of the system component(s) 120), or other components. In at least some embodiments, the profile storage 370 may only store profile data for a user or group of users specifically associated with the device 110. Similar to as described above with respect to skill component 290, a skill component 390 may communicate with a skill system component(s) 225. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 280.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 324, of the device 110, may include a hybrid proxy (HP) 326 configured to proxy traffic to/from the system component(s) 120. For example, the HP 326 may be configured to send messages to/from a hybrid execution controller (HEC) 327 of the hybrid selector 324. For example, command/directive data received from the system component(s) 120 can be sent to the HEC 327 using the HP 326. The HP 326 may also be configured to allow the audio data 111 to pass to the system component(s) 120 while also receiving (e.g., intercepting) this audio data 111 and sending the audio data 111 to the HEC 327.

In at least some embodiments, the hybrid selector 324 may further include a local request orchestrator (LRO) 328 configured to notify the ASR component 150 about the availability of new audio data 111 that represents user speech, and to otherwise initiate the operations of local language processing when new audio data 111 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 111 is received, the HP 326 may allow the audio data 111 to pass through to the system component(s) 120 and the HP 326 may also input the audio data 111 to the on-device ASR component 150 by routing the audio data 111 through the HEC 327 of the hybrid selector 324, whereby the LRO 328 notifies the ASR component 150 of the audio data 111. At this point, the hybrid selector 324 may wait for response data from either or both of the system component(s) 120 or the local language processing components. However, the disclosure is not limited thereto, and in some examples the hybrid selector 324 may send the audio data 111 only to the local ASR component 150 without departing from the disclosure. For example, the device 110 may process the audio data 111 locally without sending the audio data 111 to the system component(s) 120.

The local ASR component 150 is configured to receive the audio data 111 from the hybrid selector 324, and to recognize speech in the audio data 111, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 5.

The device 110 and/or the system component(s) 120 may associate a unique identifier with each natural language user input. The device 110 may include the unique identifier when sending the audio data 111 to the system component(s) 120, and the response data from the system component(s) 120 may include the unique identifier to identify which natural language user input the response data corresponds.

In at least some embodiments, the device 110 may include, or be configured to use, one or more skill components 390 that may work similarly to the skill component(s) 290 implemented by the system component(s) 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill system component(s) 225. For example, a skill system component(s) 225 may be located in a remote environment (e.g., separate location) such that the device 110 may only communicate with the skill system component(s) 225 via the network(s) 199. However, the disclosure is not limited thereto. For example, in at least some embodiments, a skill system component(s) 225 may be configured in a local environment (e.g., home server and/or the like) such that the device 110 may communicate with the skill system component(s) 225 via a private network, such as a local area network (LAN).

As used herein, a "skill" may refer to a skill component 390, a skill system component(s) 225, or a combination of a skill component 390 and a corresponding skill system component(s) 225.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

The device 110 may include a device context manager 374. The device context manager 374 may determine the context of the device, for example, device location (e.g., global positioning system (GPS) data), what skills/applications are operating on the device, whether the device is presenting content (e.g., audio content, image content, etc.) and potential entity information related to the content such as name(s) of a song playing, names of entities about whom information is being presented on a display of a device, or the like. The device context manager 374 may also determine information related to the user of the device and/or other users in the presence of the device (for example in conjunction with user recognition 295). The device context manager 374 may also determine information related to other devices in the environment of the device 110, or information related to other conditions of the environment. Such information may be used to determine entity information to be used and encoded in the manner described above, for example in relation to context selector 470 described below in reference to FIG. 4.

Figure 4:
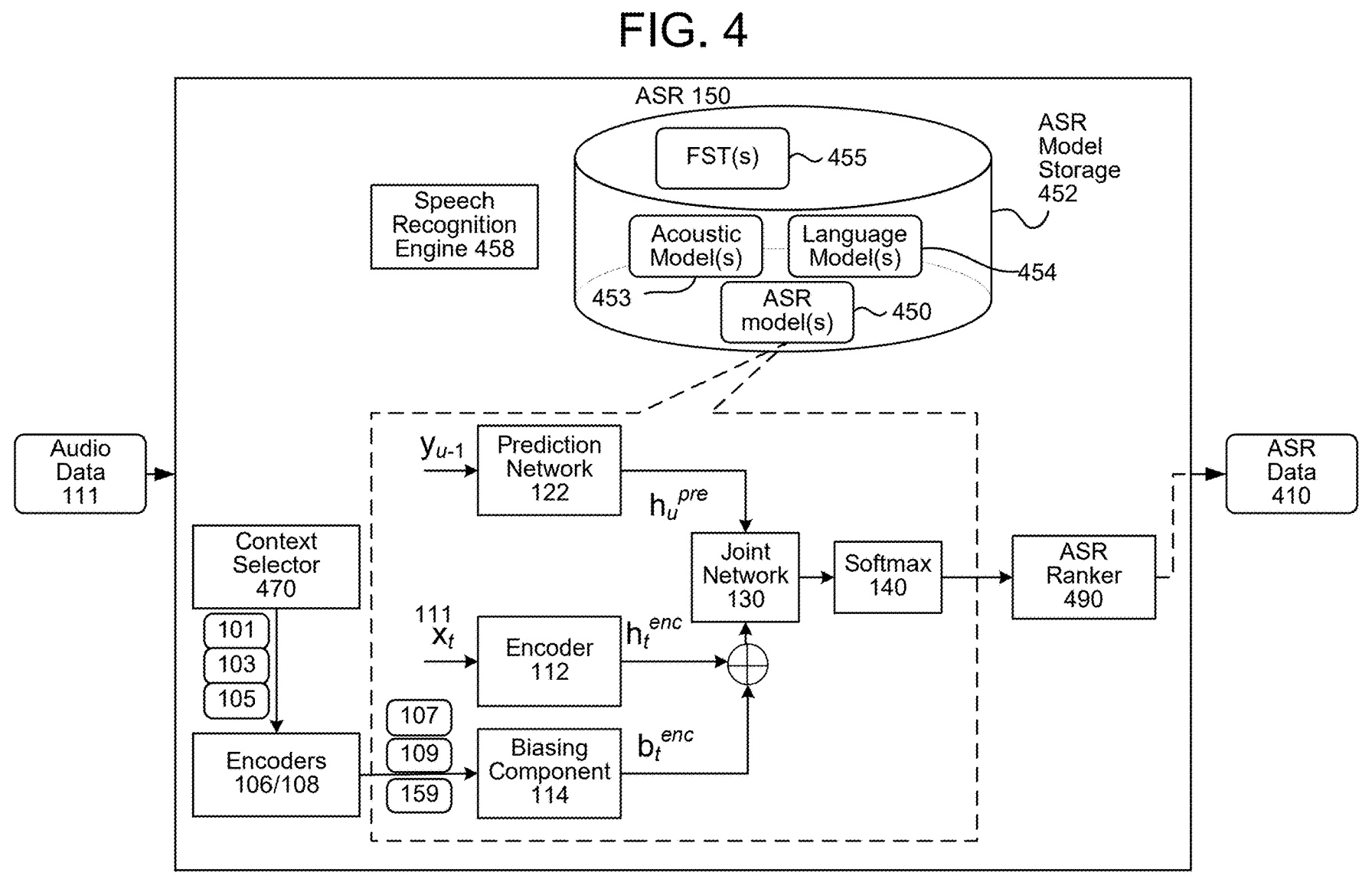

FIG. 4 is a conceptual diagram of an ASR component 150, according to embodiments of the present disclosure. The ASR component 150 may interpret a spoken natural language input based on the similarity between the spoken natural language input and pre-established language models 454 stored in an ASR model storage 452. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 455 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 458. The ASR component 150 receives audio data 111 (for example, received from a local device 110 having processed audio detected by a microphone by an acoustic front end (AFE) or other component). The speech recognition engine 458 compares the audio data 111 with acoustic models 453, language models 454, FST(s) 455, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting device(s) 120 encoded, in which case they may be decoded by the speech recognition engine 458 and/or prior to processing by the speech recognition engine 458.

In some implementations, the ASR component 150 may process the audio data 111 using one or more ASR model(s) 450. The ASR model 450 may be, for example, a recurrent neural network such as a recurrent neural network transducer (RNN-T). An example RNN-T architecture is illustrated in FIGS. 1A, 1B, and 4. The ASR model 450 may predict a probability $(y|x)$ of labels $y=(y_1, \ldots y_u)$ given acoustic features $x=(x_1, \ldots, x_t)$ taken from audio data 111. During inference, the ASR model 450 can generate an N-best list using, for example, a beam search decoding algorithm. The ASR model 450 may include an encoder 112, a prediction network 122, a joint network 130, and a softmax 140. The encoder 112 may be similar or analogous to an acoustic model (e.g., similar to the acoustic model 453 described below), and may process a sequence of acoustic input features to generate encoded hidden representations. The prediction network 122 may be similar or analogous to a language model (e.g., similar to the language model 454 described below), and may process the previous output label predictions, and map them to corresponding hidden representations. The joint network 130 may be, for example, a feed forward neural network (NN) that may process hidden representations from both the encoder 112 and prediction network 122, and predict output label probabilities. The softmax 140 may be a function implemented (e.g., as a layer of the joint network 130) to normalize the predicted output probabilities.

As noted above, the operation of the ASR component 150 may rely on contextual entities, that is entities who may be related to the utterance/user/audio data 111 and whose textual information/pronunciation information (e.g., 101/103/105) may be considered by ASR component 150 as represented, for example, by embedding data 107/109/159. The context selector 470 may perform processing to determine which one or more entities should be considered contextual entities for the particular processing, and thus which text/pronunciation information/embeddings corresponding to the one or more entities should be processed/sent to the ASR component 150.

The context selector 470 may consider a variety of information to determine the contextual entities. For example, the context selector 470 may receive user recognition data (e.g., as determined by user-recognition component 295) which may indicate the user and/or user profile corresponding to a spoken utterance. The context selector 470 may then receive (e.g., from profile storage 270/370) an indication of entities corresponding to the user/user profile. Such entities may include, for example, contacts indicated in contact data, family members, skills/applications installed/enabled on a particular device/with respect to a user profile, smart home device(s), names associated with a local neighborhood (e.g., street names, school names, business names, etc.), business names (e.g., of locations, businesses, products, etc.), product names (such as grocery item brands, etc.), names of media content (e.g., songs, movies, or shows associated with a user profile), data associated with one or more gazetteers 584 (discussed below) which may be associated with a skill/application enabled with respect to device 110 and/or the user profile of the utterance, entities associated with a particular virtual assistant and/or a particular wakeword of the utterance, entities associated with a news service, and/or a variety of other entities. The context selector 470 may also receive device information (for example from device context manager 374) such as a device ID, device type, device location (e.g., global positioning system (GPS) data), etc. and may determine contextual entities that may correspond to the device information (e.g., names of device features, names of entities (e.g., stores) nearby to the device, or the like). Such device information may also include information corresponding to what is being presented on a display of a device, such as choices of recipes, media content, applications to launch, etc. The context selector 470 may also receive information from a dialog manager 272 which may indicate one or more entities relevant to a dialog exchange involving the user and the system. As can be appreciated, the context selector 470 may use a variety of information to determine a plurality of entities that may be potentially related to a particular utterance for present processing, such as determining data 101, 103, 105, 107, 109, and/or 159.

To select which entity/entities may be relevant to a particular utterance for processing as described herein, the context selector 470 may use different rules, statistical models, and/or machine learning component(s) configured to identify and/or select potential entities for purposes of determining data 101/103/105.

The text/pronunciation information/embeddings for the selected contextual entities may be determined. In certain configurations text/pronunciation information may come from one or more users (e.g., when inputting data showing the text and providing the pronunciation for an entity name. Such information may also come from a developer associated with a skill/application, such as providing text and pronunciation information related to names/words associated with operation of the skill/application. The system 100 may also receive text/pronunciation information from a variety of other sources, for example a news source which may provide text and pronunciation information related to names/words that may be related to a news story and which may previously have not been available to the system (for example for new personalities, technologies, words in use, etc.). As can be appreciated, text/pronunciation information may be received from a multitude of potential sources. Once received the system 100 may also determine embeddings using the respective text/pronunciation information, for example determining the text embedding(s) and/or pronunciation embedding(s). Such embedding data may be determined ahead of time and stored by the system 100, for example in a manner associated with the respective entities.

Such embedding data may also be determined at runtime, for example for use by ASR component 150 with respect to an entity determined to be potentially relevant to a particular utterance/input audio data 111. In the situation where certain entities associated with the user may be known ahead of time (for example entities associated with a user's customized music catalog), embedding data 107/109/159 may be determined prior to detection of an utterance and retrieved as needed by context selector 470. In the situation where embedding data is not pre-determined, the system may determine the embedding data 107/109/159 as needed for present processing.

The ASR component 150 may use the embedding data 107/109/159 to perform processing as described above. As a result of that processing, the softmax 140 may output probability data P 141. In certain configurations the top scoring hypothesis of such probability data P 141 may be output as ASR output data 410. In other configurations, the system may process the probability data P 141 by an ASR ranker 490 to determine the ASR output data 410. The ASR ranker 490 may perform rescoring (for example using a language model) based on a variety of input data (for example, similar data to other data 691 used by NLU component 260 as described below) to determine one or more ASR hypotheses to include in ASR output data 410.

The speech recognition engine 458 may process the audio data 111 with reference to information stored in the ASR model storage 452. Feature vectors of the audio data 111 may arrive at the system component(s) 120 encoded, in which case they may be decoded prior to processing by the speech recognition engine 458.

The speech recognition engine 458 attempts to match received feature vectors to language acoustic units (e.g., phonemes) and words as known in the stored acoustic models 453, language models 454, and FST(s) 455. For example, audio data 111 may be processed by one or more acoustic model(s) 453 to determine acoustic unit data. The acoustic unit data may include indicators of acoustic units detected in the audio data 111 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 454 (and/or using FST 455) to determine ASR data 410. The ASR data 410 can include one or more hypotheses. One or more of the hypotheses represented in the ASR data 410 may then be sent to further components (such as the NLU component 260/360) for further processing as discussed herein. The ASR data 410 may include representations of text of an utterance, such as words, subword units, or the like.

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 6:
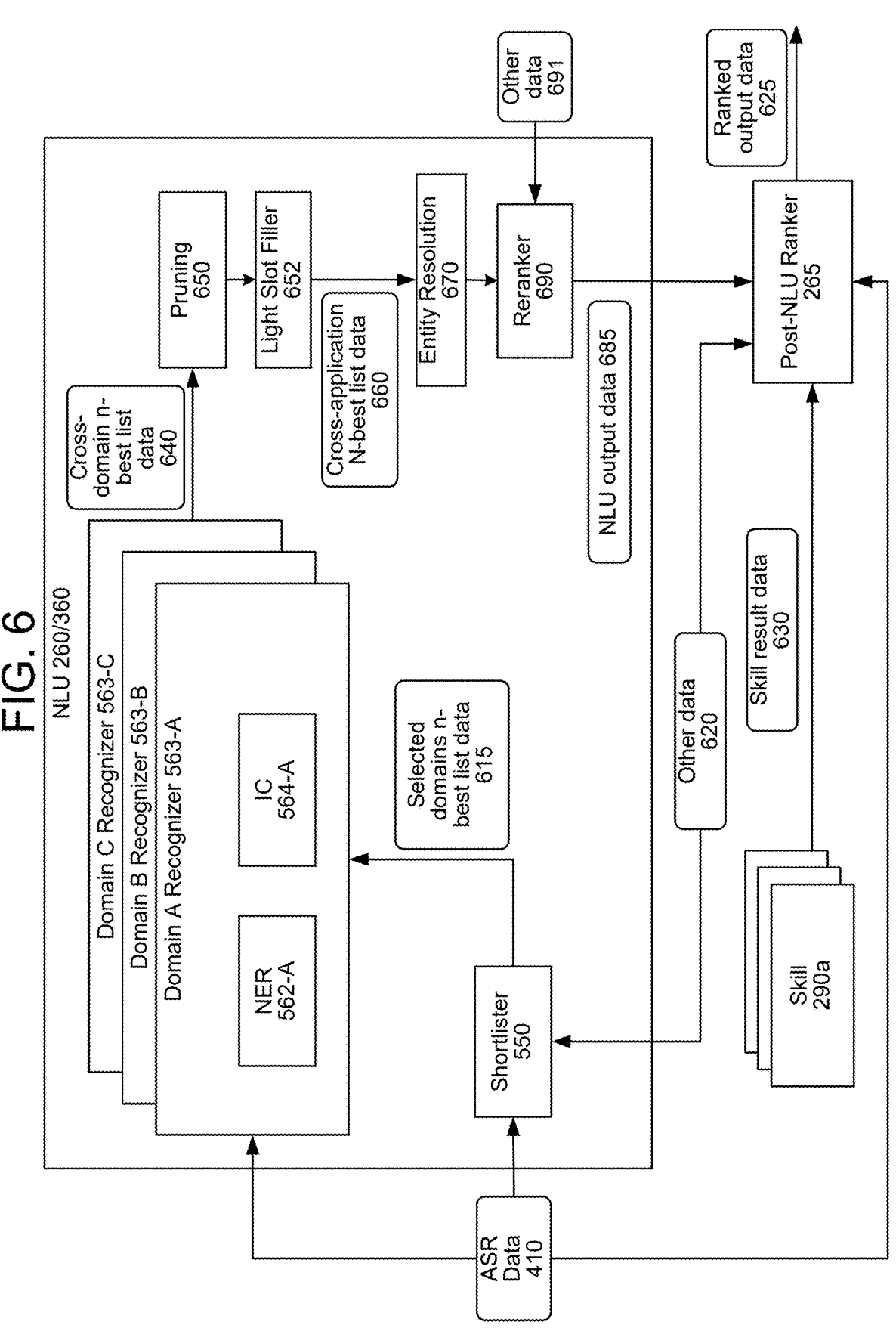
FIG. 6 is a conceptual diagram of how natural language processing is performed, according to embodiments of the present disclosure.

FIGS. 5 and 6 illustrates how the NLU component 260 may perform NLU processing. FIG. 5 is a conceptual diagram of how natural language processing is performed, according to embodiments of the present disclosure. And FIG. 6 is a conceptual diagram of how natural language processing is performed, according to embodiments of the present disclosure.

FIG. 5 illustrates how NLU processing is performed on text data. The NLU component 260 may process text data including several ASR hypotheses of a single user input. For example, if the ASR component 150 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 550. The shortlister component 550 selects skills that may execute with respect to ASR output data 410 input to the NLU component 260 (e.g., applications that may execute with respect to the user input). The ASR output data 410 (which may also be referred to as ASR data 410) may include representations of text of an utterance, such as words, subword units, or the like. The shortlister component 550 thus limits downstream, more resource intensive NLU processes to being performed with respect to skills that may execute with respect to the user input.

Without a shortlister component 550, the NLU component 260 may process ASR output data 410 input thereto with respect to every skill of the system, either in parallel, in series, or using some combination thereof. By implementing a shortlister component 550, the NLU component 260 may process ASR output data 410 with respect to only the skills that may execute with respect to the user input. This reduces total compute power and latency attributed to NLU processing.

The shortlister component 550 may include one or more trained models. The model(s) may be trained to recognize various forms of user inputs that may be received by the system component(s) 120. For example, during a training period a skill system component(s) 225 associated with a skill may provide the system component(s) 120 with training text data representing sample user inputs that may be provided by a user to invoke the skill. For example, for a ride sharing skill, a skill system component(s) 225 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 550 may be trained, using the training text data representing sample user inputs, to determine other potentially related user input structures that users may try to use to invoke the particular skill. During training, the system component(s) 120 may solicit the skill system component(s) 225 associated with the skill regarding whether the determined other user input structures are permissible, from the perspective of the skill system component(s) 225, to be used to invoke the skill. The alternate user input structures may be derived by one or more trained models during model training and/or may be based on user input structures provided by different skills. The skill system component(s) 225 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 550 may be trained with respect to a different skill. Alternatively, the shortlister component 550 may use one trained model per domain, such as one trained model for skills associated with a weather domain, one trained model for skills associated with a ride sharing domain, etc.

The system component(s) 120 may use the sample user inputs provided by a skill system component(s) 225, and related sample user inputs potentially determined during training, as binary examples to train a model associated with a skill associated with the skill system component(s) 225. The model associated with the particular skill may then be operated at runtime by the shortlister component 550. For example, some sample user inputs may be positive examples (e.g., user inputs that may be used to invoke the skill). Other sample user inputs may be negative examples (e.g., user inputs that may not be used to invoke the skill).

As described above, the shortlister component 550 may include a different trained model for each skill of the system, a different trained model for each domain, or some other combination of trained model(s). For example, the shortlister component 550 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 550 to output indications of only a portion of the skills that the ASR output data 410 may relate to. For example, a user input may correspond to "tell me about Tom Collins." If the model is clustered based on domain, the shortlister component 550 may determine the user input corresponds to a recipe skill (e.g., a drink recipe) even though the user input may also correspond to an information skill (e.g., including information about a person named Tom Collins).

The NLU component 260 may include one or more recognizers 563. In at least some embodiments, a recognizer 563 may be associated with a skill system component(s) 225 (e.g., the recognizer may be configured to interpret text data to correspond to the skill system component(s) 225). In at least some other examples, a recognizer 563 may be associated with a domain such as smart home, video, music, weather, custom, etc. (e.g., the recognizer may be configured to interpret text data to correspond to the domain).

If the shortlister component 550 determines ASR output data 410 is potentially associated with multiple domains, the recognizers 563 associated with the domains may process the ASR output data 410, while recognizers 563 not indicated in the shortlister component 550's output may not process the ASR output data 410. The "shortlisted" recognizers 563 may process the ASR output data 410 in parallel, in series, partially in parallel, etc. For example, if ASR output data 410 potentially relates to both a communications domain and a music domain, a recognizer associated with the communications domain may process the ASR output data 410 in parallel, or partially in parallel, with a recognizer associated with the music domain processing the ASR output data 410.

Each recognizer 563 may include a named entity recognition (NER) component 562. The NER component 562 attempts to identify grammars and lexical information that may be used to construe meaning with respect to text data input therein. The NER component 562 identifies portions of text data that correspond to a named entity associated with a domain, associated with the recognizer 563 implementing the NER component 562. The NER component 562 (or other component of the NLU component 260) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar database 576, a particular set of intents/actions 574, and a particular personalized lexicon 586. The grammar databases 576, and intents/actions 574 may be stored in an NLU storage 573. Each gazetteer 584 may include domain/skill-indexed lexical information associated with a particular user and/or device 110. For example, a Gazetteer A (584a) includes skill-indexed lexical information 586aa to 586an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 562 applies grammar information 576 and lexical information 586 associated with a domain (associated with the recognizer 563 implementing the NER component 562) to determine a mention of one or more entities in text data. In this manner, the NER component 562 identifies "slots" (each corresponding to one or more particular words in text data) that may be useful for later processing. The NER component 562 may also label each slot with a type (e.g., noun, place, city, artist name, song name, etc.).

Each grammar database 576 includes the names of entities (i.e., nouns) commonly found in speech about the particular domain to which the grammar database 576 relates, whereas the lexical information 586 is personalized to the user and/or the device 110 from which the user input originated. For example, a grammar database 576 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (584a-584n) stored in an entity library storage 582. The gazetteer information 584 may be used to match text data (representing a portion of the user input) with text data representing known entities, such as song titles, contact names, etc. Gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 parses text data to determine an intent(s) (associated with the domain associated with the recognizer 563 implementing the IC component 564) that potentially represents the user input. An intent represents to an action a user desires be performed. An IC component 564 may communicate with a database 574 of words linked to intents. For example, a music intent database may link words and phrases such as "quiet," "volume off," and "mute" to a <Mute> intent. An IC component 564 identifies potential intents by comparing words and phrases in text data (representing at least a portion of the user input) to the words and phrases in an intents database 574 (associated with the domain that is associated with the recognizer 563 implementing the IC component 564).

The intents identifiable by a specific IC component 564 are linked to domain-specific (i.e., the domain associated with the recognizer 563 implementing the IC component 564) grammar frameworks 576 with "slots" to be filled. Each slot of a grammar framework 576 corresponds to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 identifies "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

The shortlister component 550 may receive ASR output data 410 output from the ASR component 150 or output from the device 110b (as illustrated in FIG. 6). The ASR component 150 may embed the ASR output data 410 into a form processable by a trained model(s) using sentence embedding techniques as known in the art. Sentence embedding results in the ASR output data 410 including text in a structure that enables the trained models of the shortlister component 650 to operate on the ASR output data 410. For example, an embedding of the ASR output data 410 may be a vector representation of the ASR output data 410.

The shortlister component 550 may make binary determinations (e.g., yes or no) regarding which domains relate to the ASR output data 410. The shortlister component 550 may make such determinations using the one or more trained models described herein above. If the shortlister component 550 implements a single trained model for each domain, the shortlister component 550 may simply run the models that are associated with enabled domains as indicated in a user profile associated with the device 110 and/or user that originated the user input.

The shortlister component 550 may generate n-best list data 615 representing domains that may execute with respect to the user input represented in the ASR output data 410. The size of the n-best list represented in the n-best list data 615 is configurable. In an example, the n-best list data 615 may indicate every domain of the system as well as contain an indication, for each domain, regarding whether the domain is likely capable to execute the user input represented in the ASR output data 410. In another example, instead of indicating every domain of the system, the n-best list data 615 may only indicate the domains that are likely to be able to execute the user input represented in the ASR output data 410. In yet another example, the shortlister component 550 may implement thresholding such that the n-best list data 615 may indicate no more than a maximum number of domains that may execute the user input represented in the ASR output data 410. In an example, the threshold number of domains that may be represented in the n-best list data 615 is ten. In another example, the domains included in the n-best list data 615 may be limited by a threshold a score, where only domains indicating a likelihood to handle the user input is above a certain score (as determined by processing the ASR output data 410 by the shortlister component 550 relative to such domains) are included in the n-best list data 615.

The ASR output data 410 may correspond to more than one ASR hypothesis. When this occurs, the shortlister component 550 may output a different n-best list (represented in the n-best list data 615) for each ASR hypothesis. Alternatively, the shortlister component 550 may output a single n-best list representing the domains that are related to the multiple ASR hypotheses represented in the ASR output data 410.

As indicated above, the shortlister component 550 may implement thresholding such that an n-best list output therefrom may include no more than a threshold number of entries. If the ASR output data 410 includes more than one ASR hypothesis, the n-best list output by the shortlister component 550 may include no more than a threshold number of entries irrespective of the number of ASR hypotheses output by the ASR component 150. Alternatively or in addition, the n-best list output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 410, the shortlister component 550 may generate confidence scores representing likelihoods that domains relate to the ASR output data 410. If the shortlister component 550 implements a different trained model for each domain, the shortlister component 550 may generate a different confidence score for each individual domain trained model that is run. If the shortlister component 550 runs the models of every domain when ASR output data 410 is received, the shortlister component 550 may generate a different confidence score for each domain of the system. If the shortlister component 550 runs the models of only the domains that are associated with skills indicated as enabled in a user profile associated with the device 110 and/or user that originated the user input, the shortlister component 550 may only generate a different confidence score for each domain associated with at least one enabled skill. If the shortlister component 550 implements a single trained model with domain specifically trained portions, the shortlister component 550 may generate a different confidence score for each domain who's specifically trained portion is run. The shortlister component 550 may perform matrix vector modification to obtain confidence scores for all domains of the system in a single instance of processing of the ASR output data 410.

N-best list data 615 including confidence scores that may be output by the shortlister component 550 may be represented as, for example:

Search domain, 0.67
Recipe domain, 0.62
Information domain, 0.57
Shopping domain, 0.42

As indicated, the confidence scores output by the shortlister component 550 may be numeric values. The confidence scores output by the shortlister component 550 may alternatively be binned values (e.g., high, medium, low).

The n-best list may only include entries for domains having a confidence score satisfying (e.g., equaling or exceeding) a minimum threshold confidence score. Alternatively, the shortlister component 550 may include entries for all domains associated with user enabled skills, even if one or more of the domains are associated with confidence scores that do not satisfy the minimum threshold confidence score.

The shortlister component 550 may consider other data 620 when determining which domains may relate to the user input represented in the ASR output data 410 as well as respective confidence scores. The other data 620 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 620 may include an indicator of the user associated with the ASR output data 410.

The other data 620 may be character embedded prior to being input to the shortlister component 550. The other data 620 may alternatively be embedded using other techniques known in the art prior to being input to the shortlister component 550.

The other data 620 may also include data indicating the domains associated with skills that are enabled with respect to the device 110 and/or user that originated the user input. The shortlister component 550 may use such data to determine which domain-specific trained models to run. That is, the shortlister component 550 may determine to only run the trained models associated with domains that are associated with user-enabled skills. The shortlister component 550 may alternatively use such data to alter confidence scores of domains.

As an example, considering two domains, a first domain associated with at least one enabled skill and a second domain not associated with any user-enabled skills of the user that originated the user input, the shortlister component 550 may run a first model specific to the first domain as well as a second model specific to the second domain. Alternatively, the shortlister component 550 may run a model configured to determine a score for each of the first and second domains. The shortlister component 550 may determine a same confidence score for each of the first and second domains in the first instance. The shortlister component 550 may then alter those confidence scores based on which domains is associated with at least one skill enabled by the present user. For example, the shortlister component 550 may increase the confidence score associated with the domain associated with at least one enabled skill while leaving the confidence score associated with the other domain the same. Alternatively, the shortlister component 550 may leave the confidence score associated with the domain associated with at least one enabled skill the same while decreasing the confidence score associated with the other domain. Moreover, the shortlister component 550 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 550 receives the ASR output data 410, the shortlister component 550 may determine whether profile data associated with the user and/or device 110 that originated the command includes an indication of enabled skills.

The other data 620 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 550 may use such data to determine which domain-specific trained models to run. For example, if the device 110 corresponds to a displayless type device, the shortlister component 550 may determine not to run trained models specific to domains that output video data. The shortlister component 550 may alternatively use such data to alter confidence scores of domains.

As an example, considering two domains, one that outputs audio data and another that outputs video data, the shortlister component 550 may run a first model specific to the domain that generates audio data as well as a second model specific to the domain that generates video data. Alternatively the shortlister component 550 may run a model configured to determine a score for each domain. The shortlister component 550 may determine a same confidence score for each of the domains in the first instance. The shortlister component 550 may then alter the original confidence scores based on the type of the device 110 that originated the user input corresponding to the ASR output data 410. For example, if the device 110 is a displayless device, the shortlister component 550 may increase the confidence score associated with the domain that generates audio data while leaving the confidence score associated with the domain that generates video data the same. Alternatively, if the device 110 is a displayless device, the shortlister component 550 may leave the confidence score associated with the domain that generates audio data the same while decreasing the confidence score associated with the domain that generates video data. Moreover, if the device 110 is a displayless device, the shortlister component 550 may increase the confidence score associated with the domain that generates audio data as well as decrease the confidence score associated with the domain that generates video data.

The type of device information represented in the other data 620 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 620 may represent the smart TV of other display device, and not the displayless device that captured the spoken user input.

The other data 620 may also include data indicating the user input originating device's speed, location, or other mobility information. For example, the device may correspond to a vehicle including a display. If the vehicle is moving, the shortlister component 550 may decrease the confidence score associated with a domain that generates video data as it may be undesirable to output video content to a user while the user is driving. The device may output data to the system component(s) 120 indicating when the device is moving.

The other data 620 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 550 may use such data to alter confidence scores of domains. For example, the shortlister component 550 may run a first model specific to a first domain as well as a second model specific to a second domain. Alternatively, the short-lister component 550 may run a model configured to determine a score for each domain. The shortlister component 550 may also determine a same confidence score for each of the domains in the first instance. The shortlister component 550 may then alter the original confidence scores based on the first domain being invoked to cause the system to output content while the current user input was received. Based on the first domain being invoked, the shortlister component 550 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 615 generated by the shortlister component 550 as well as the different types of other data 620 considered by the shortlister component 550 are configurable. For example, the shortlister component 550 may update confidence scores as more other data 620 is considered. For further example, the n-best list data 615 may exclude relevant domains if thresholding is implemented. Thus, for example, the shortlister component 550 may include an indication of a domain in the n-best list 615 unless the shortlister component 550 is one hundred percent confident that the domain may not execute the user input represented in the ASR output data 410 (e.g., the shortlister component 550 determines a confidence score of zero for the domain).

The shortlister component 550 may send the ASR output data 410 to recognizers 563 associated with domains represented in the n-best list data 615. Alternatively, the short-lister component 550 may send the n-best list data 615 or some other indicator of the selected subset of domains to another component (such as the orchestrator component 230) which may in turn send the ASR output data 410 to the recognizers 563 corresponding to the domains included in the n-best list data 615 or otherwise indicated in the indicator. If the shortlister component 550 generates an n-best list representing domains without any associated confidence scores, the shortlister component 550/orchestrator component 230 may send the ASR output data 410 to recognizers 563 associated with domains that the shortlister component 550 determines may execute the user input. If the shortlister component 550 generates an n-best list representing domains with associated confidence scores, the shortlister component 550/orchestrator component 230 may send the ASR output data 410 to recognizers 563 associated with domains associated with confidence scores satisfying (e.g., meeting or exceeding) a threshold minimum confidence score.

A recognizer 563 may output tagged text data generated by an NER component 562 and an IC component 564, as described herein above. The NLU component 260 may compile the output tagged text data of the recognizers 563 into a single cross-domain n-best list 640 and may send the cross-domain n-best list 640 to a pruning component 650. Each entry of tagged text (e.g., each NLU hypothesis) represented in the cross-domain n-best list data 640 may be associated with a respective score indicating a likelihood that the NLU hypothesis corresponds to the domain associated with the recognizer 563 from which the NLU hypothesis was output. For example, the cross-domain n-best list data 640 may be represented as (with each line corresponding to a different NLU hypothesis):

[0.95] Intent: <PlayMusic> ArtistName: Beethoven Song-Name: Waldstein Sonata

[0.70] Intent: <Play Video> ArtistName: Beethoven Vide-oName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 650 may sort the NLU hypotheses represented in the cross-domain n-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may also or alternatively perform number of NLU hypothesis thresholding. For example, the pruning component 650 may select the top scoring NLU hypothesis(es). The pruning component 650 may output a portion of the NLU hypotheses input thereto. The purpose of the pruning component 650 is to create a reduced list of NLU hypotheses so that downstream, more resource intensive, processes may only operate on the NLU hypotheses that most likely represent the user's intent.

The NLU component 260 may include a light slot filler component 652. The light slot filler component 652 can take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., 572. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-domain n-best list data 660.

The cross-domain n-best list data 660 may be input to an entity resolution component 670. The entity resolution component 670 can apply rules or other instructions to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 can refer to a knowledge base (e.g., 572) that is used to specifically identify the precise entity referred to in each slot of each NLU hypothesis represented in the cross-domain n-best list data 660. Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output an altered n-best list that is based on the cross-domain n-best list 660 but that includes more detailed information (e.g., entity IDs) about the specific entities mentioned in the slots and/or more detailed slot data that can eventually be used by a skill. The NLU component 260 may include multiple entity resolution components 670 and each entity resolution component 670 may be specific to one or more domains.

The NLU component 260 may include a reranker 690. The reranker 690 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, or other techniques. The reranker 690 may consider not only the data output by the entity resolution component 670, but may also consider other data 691. The other data 691 may include a variety of information. For example, the other data 691 may include skill rating or popularity data. For example, if one skill has a high rating, the reranker 690 may increase the score of a NLU hypothesis that may be processed by the skill. The other data 691 may also include information about skills that have been enabled by the user that originated the user input. For example, the reranker 690 may assign higher scores to NLU hypothesis that may be processed by enabled skills than NLU hypothesis that may be processed by non-enabled skills. The other data 691 may also include data indicating user usage history, such as if the user that originated the user input regularly uses a particular skill or does so at particular times of day. The other data 691 may additionally include data indicating date, time, location, weather, type of device 110, user identifier, context, as well as other information. For example, the reranker 690 may consider when any particular skill is currently active (e.g., music being played, a game being played, etc.).

As illustrated and described, the entity resolution component 670 is implemented prior to the reranker 690. The entity resolution component 670 may alternatively be implemented after the reranker 690. Implementing the entity resolution component 670 after the reranker 690 limits the NLU hypotheses processed by the entity resolution component 670 to only those hypotheses that successfully pass through the reranker 690.

The reranker 690 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system component(s) 120 (e.g., designated 290 in FIG. 2). The NLU component 260 may separately perform NLU processing described above with respect to domains associated with skills that are at least partially implemented as part of the skill system component(s) 225. In an example, the shortlister component 550 may only process with respect to these latter domains. Results of these two NLU processing paths may be merged into NLU output data 685, which may be sent to a post-NLU ranker 265, which may be implemented by the system component(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 685, skill result data 630, and the other data 620 in order to output ranked output data 625. The ranked output data 625 may include an n-best list where the NLU hypotheses in the NLU results data 685 are reordered such that the n-best list in the ranked output data 625 represents a prioritized list of skills to respond to a user input as determined by the post-NLU ranker 265. The ranked output data 625 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 685 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 630 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 630a generated from the first skill 290a's execution with respect to the first NLU hypothesis. The post-NLU ranker 265 also receives, from the second skill 290b, second results data 630b generated from the second skill 290b's execution with respect to the second NLU hypothesis.

The result data 630 may include various portions. For example, the result data 630 may include content (e.g., audio data, text data, and/or video data) to be output to a user. The result data 630 may also include a unique identifier used by the system component(s) 120 and/or the skill system component(s) 225 to locate the data to be output to a user. The result data 630 may also include an instruction. For example, if the user input corresponds to "turn on the light," the result data 630 may include an instruction causing the system to turn on a light associated with a profile of the device (110a/110b) and/or user.

The post-NLU ranker 265 may consider the first result data 630a and the second result data 630b to alter the first confidence score and the second confidence score of the first NLU hypothesis and the second NLU hypothesis, respectively. That is, the post-NLU ranker 265 may generate a third confidence score based on the first result data 630a and the first confidence score. The third confidence score may correspond to how likely the post-NLU ranker 265 determines the first skill will correctly respond to the user input. The post-NLU ranker 265 may also generate a fourth confidence score based on the second result data 630b and the second confidence score. One skilled in the art will appreciate that a first difference between the third confidence score and the fourth confidence score may be greater than a second difference between the first confidence score and the second confidence score. The post-NLU ranker 265 may also consider the other data 620 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 630 associated with the skill 290 with the highest altered confidence score to be the data output in response to the current user input. The post-NLU ranker 265 may also consider the ASR output data 410 to alter the NLU hypotheses confidence scores.

The orchestrator component 230 may, prior to sending NLU results data 685 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 685, including NLU hypotheses paired with skills 290, to the post-NLU ranker 265. In response to ASR output data 410 corresponding to "what should I do for dinner today," the orchestrator component 230 may generates pairs of skills 290 with associated NLU hypotheses corresponding to:

Skill 1/NLU hypothesis including <Help> intent
    Skill 2/NLU hypothesis including <Order> intent
    Skill 3/NLU hypothesis including <DishType> intent The post-NLU ranker 265 queries each skill 290, paired with a NLU hypothesis in the NLU output data 685, to provide result data 630 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
    Skill 2: Second NLU hypothesis including <Order> intent indicator
    Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 630. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 630 indicating slots of a framework that the skill 290 further needs filled or entities that the skill 290 further needs resolved prior to the skill 290 being able to provided result data 630 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
    Skill 2: indication representing the skill needs to the system to obtain further information
    Skill 3: indication representing the skill can provide numerous results in response to the third NLU hypothesis including the <DishType> intent indicator Result data 630 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 630 provided by the skills 290 to alter the NLU processing confidence scores generated by the reranker 690. That is, the post-NLU ranker 265 uses the result data 630 provided by the queried skills 290 to create larger differences between the NLU processing confidence scores generated by the reranker 690. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 630 responsive to NLU hypotheses over skills 290 that provide result data 630 corresponding to an indication that further information is needed, as well as skills 290 that provide result data 630 indicating they can provide multiple responses to received NLU hypotheses. For example, the post-NLU ranker 265 may generate a first score for a first skill 290a that is greater than the first skill's NLU confidence score based on the first skill 290a providing result data 630a including a response to a NLU hypothesis. For further example, the post-NLU ranker 265 may generate a second score for a second skill 290b that is less than the second skill's NLU confidence score based on the second skill 290b providing result data 630b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 630c indicating the third skill 290c can provide multiple responses to a NLU hypothesis.

The post-NLU ranker 265 may consider other data 620 in determining scores. The other data 620 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 620 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 685, the post-NLU ranker 265 may determine whether profile data, associated with the user and/or device that originated the user input, includes indications of enabled skills.

The other data 620 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 620 may include information indicating the veracity of the result data 630 provided by a skill 290. For example, if a user says "tell me a recipe for pasta sauce," a first skill 290a may provide the post-NLU ranker 265 with first result data 630a corresponding to a first recipe associated with a five star rating and a second skill 290b may provide the post-NLU ranker 265 with second result data 630b corresponding to a second recipe associated with a one star rating. In this situation, the post-NLU ranker 265 may increase the NLU processing confidence score associated with the first skill 290a based on the first skill 290a providing the first result data 630a associated with the five star rating and/or decrease the NLU processing confidence score associated with the second skill 290b based on the second skill 290b providing the second result data 630b associated with the one star rating.

The other data 620 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 620 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oregon. A second skill 290b may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290a and/or decrease the NLU processing confidence score associated with the second skill 290b. Likewise, if the device and/or user that originated the user input is located in Boston, Massachusetts, the post-NLU ranker 265 may increase the NLU processing confidence score associated with the second skill 290b and/or decrease the NLU processing confidence score associated with the first skill 290a.

The other data 620 may include information indicating a time of day. The system may be configured with skills 290 that operate with respect to certain times of day. For example, a user may provide a user input corresponding to "order me food." A first skill 290a may generate first result data 630a corresponding to breakfast. A second skill 290b may generate second result data 630b corresponding to dinner. If the system component(s) 120 receives the user input in the morning, the post-NLU ranker 265 may increase the NLU processing confidence score associated with the first skill 290a and/or decrease the NLU processing score associated with the second skill 290b. If the system component(s) 120 receives the user input in the afternoon or evening, the post-NLU ranker 265 may increase the NLU processing confidence score associated with the second skill 290b and/or decrease the NLU processing confidence score associated with the first skill 290a.

The other data 620 may include information indicating user preferences. The system may include multiple skills 290 configured to execute in substantially the same manner. For example, a first skill 290a and a second skill 290b may both be configured to order food from respective restaurants.

The system may store a user preference (e.g., in the profile storage 270) that is associated with the user that provided the user input to the system component(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 620 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 620 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 620 may include information indicating how long it took a skill 290 to provide result data 630 to the post-NLU ranker 265. When the post-NLU ranker 265 multiple skills 290 for result data 630, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 620 to increase and decrease NLU processing confidence scores associated with various skills 290 that the post-NLU ranker 265 has already requested result data from. Alternatively, the post-NLU ranker 265 may use the other data 620 to determine which skills 290 to request result data from. For example, the post-NLU ranker 265 may use the other data 620 to increase and/or decrease NLU processing confidence scores associated with skills 290 associated with the NLU results data 685 output by the NLU component 260. The post-NLU ranker 265 may select n-number of top scoring altered NLU processing confidence scores. The post-NLU ranker 265 may then request result data 630 from only the skills 290 associated with the selected n-number of NLU processing confidence scores.

As described, the post-NLU ranker 265 may request result data 630 from all skills 290 associated with the NLU results data 685 output by the NLU component 260. Alternatively, the system component(s) 120 may prefer result data 630 from skills implemented entirely by the system component(s) 120 rather than skills at least partially implemented by the skill system component(s) 225. Therefore, in the first instance, the post-NLU ranker 265 may request result data 630 from only skills associated with the NLU results data 685 and entirely implemented by the system component(s) 120. The post-NLU ranker 265 may only request result data 630 from skills associated with the NLU results data 685, and at least partially implemented by the skill system component(s) 225, if none of the skills, wholly implemented by the system component(s) 120, provide the post-NLU ranker 265 with result data 630 indicating either data response to the NLU results data 685, an indication that the skill can execute the user input, or an indication that further information is needed.

As indicated above, the post-NLU ranker 265 may request result data 630 from multiple skills 290. If one of the skills 290 provides result data 630 indicating a response to a NLU hypothesis and the other skills provide result data 630 indicating either they cannot execute or they need further information, the post-NLU ranker 265 may select the result data 630 including the response to the NLU hypothesis as the data to be output to the user. If more than one of the skills 290 provides result data 630 indicating responses to NLU hypotheses, the post-NLU ranker 265 may consider the other data 620 to generate altered NLU processing confidence scores, and select the result data 630 of the skill associated with the greatest score as the data to be output to the user.

A system that does not implement the post-NLU ranker 265 may select the highest scored NLU hypothesis in the NLU results data 685. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 685 to provide result data 630 to the post-NLU ranker 265 prior to the post-NLU ranker 265 ultimately determining the skill 290 to be invoked to respond to the user input. Some of the skills 290 may provide result data 630 indicating responses to NLU hypotheses while other skills 290 may providing result data 630 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 630, associated with the skill 290 associated with the highest score, for output to the user. Alternatively, the post-NLU ranker 265 may output ranked output data 625 indicating skills 290 and their respective post-NLU ranker rankings. Since the post-NLU ranker 265 receives result data 630, potentially corresponding to a response to the user input, from the skills 290 prior to post-NLU ranker 265 selecting one of the skills or outputting the ranked output data 625, little to no latency occurs from the time skills provide result data 630 and the time the system outputs responds to the user.

If the post-NLU ranker 265 selects result audio data to be output to a user and the system determines content should be output audibly, the post-NLU ranker 265 (or another component of the system component(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system component(s) 120) may cause the device 110*b* to display text corresponding to the result text data. If the post-NLU ranker 265 selects result audio data to output to a user and the system determines content should be output visually, the post-NLU ranker 265 (or another component of the system component(s) 120) may send the result audio data to the ASR component 150. The ASR component 150 may generate output text data corresponding to the result audio data. The system component(s) 120 may then cause the device 110*b* to display text corresponding to the output text data. If the post-NLU ranker 265 selects result text data to output to a user and the system determines content should be output audibly, the post-NLU ranker 265 (or another component of the system component(s) 120) may send the result text data to the TTS component 280. The TTS component 280 may generate output audio data (corresponding to computer-generated speech) based on the result text data. The system component(s) 120 may then cause the device 110*a* and/or the device 110*b* to output audio corresponding to the output audio data.

As described, a skill 290 may provide result data 630 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 630 indicating a response to the user input, the post-NLU ranker 265 (or another component of the system component(s) 120, such as the orchestrator component 230) may simply cause content corresponding to the result data 630 to be output to the user. For example, the post-NLU ranker 265 may send the result data 630 to the orchestrator component 230. The orchestrator component 230 may cause the result data 630 to be sent to the device (110*a*/110*b*), which may output audio and/or display text corresponding to the result data 630. The orchestrator component 230 may send the result data 630 to the ASR component 150 to generate output text data and/or may send the result data 630 to the TTS component 280 to generate output audio data, depending on the situation.

The skill 290 associated with the highest post-NLU ranker score may provide the post-NLU ranker 265 with result data 630 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 265 may simply cause the received instruction data be output by the device (110*a*/110*b*). Alternatively, the instruction data may be in a format that is not capable of being output by the device (110*a*/110*b*). When this occurs, the post-NLU ranker 265 may cause the ASR component 150 or the TTS component 280 to process the instruction data, depending on the situation, to generate instruction data that may be output by the device (110*a*/110*b*). Once the user provides the system with all further information needed by the skill 290, the skill 290 may provide the system with result data 630 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 630 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 630, the system may further engage a transactional skill 290 after the transactional skill 290 provides the post-NLU ranker 265 with result data 630 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
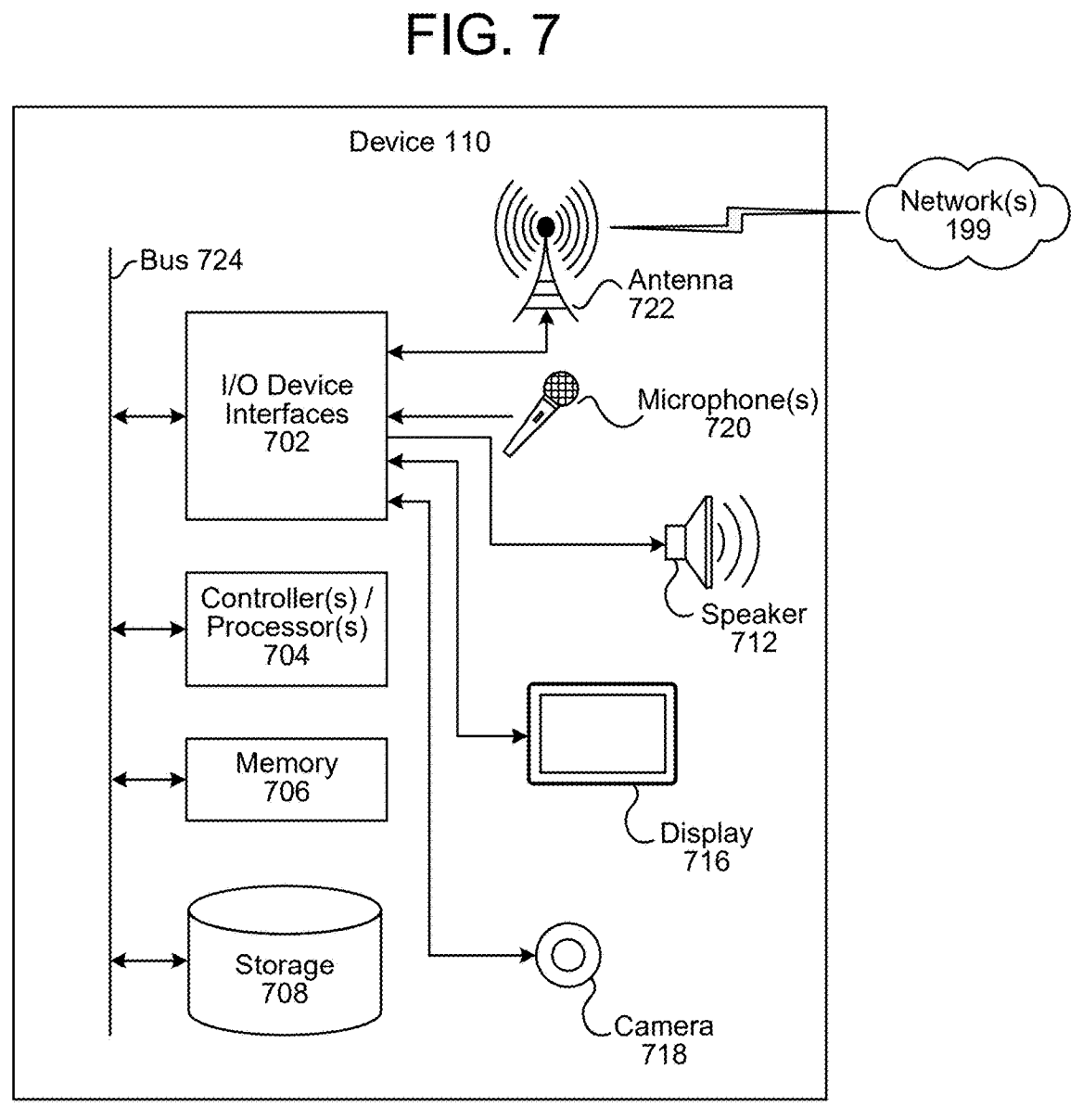
Figure 8:
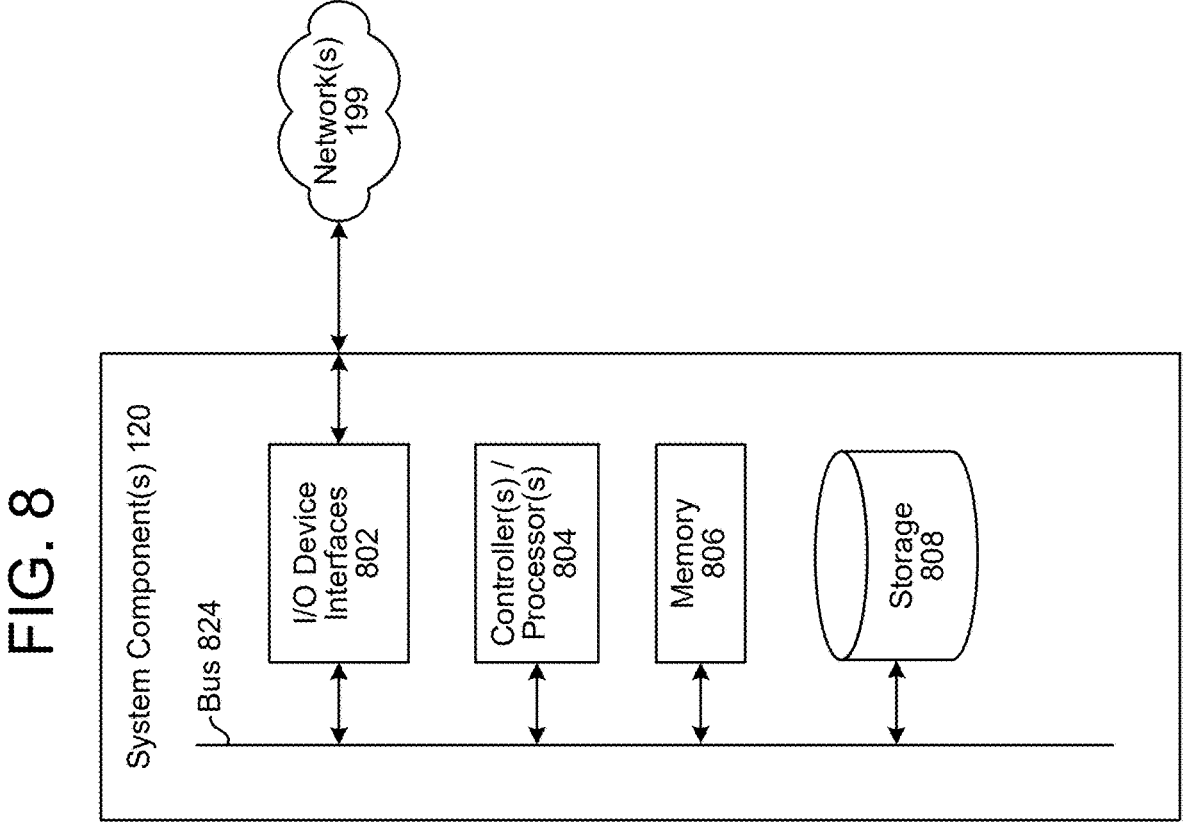
FIG. 8 is a block diagram conceptually illustrating example components of a system, according to embodiments of the present disclosure.

FIG. 7 is a block diagram conceptually illustrating a device 110 that may be used with the system. FIG. 8 is a block diagram conceptually illustrating example components of a remote device, such as the natural language command processing system component(s) 120, which may assist with ASR processing, NLU processing, etc., and a skill system component(s) 225. A system component (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple system component(s) (120/225) may be included in the overall system 100 of the present disclosure, such as one or more natural language processing systems 120 for performing ASR processing, one or more natural language processing systems 120 for performing NLU processing, one or more skill system component(s) 225, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (702/802).

Computer instructions for operating each device (110/120/225) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225) includes input/output device interfaces (702/802). A variety of components may be connected through the input/output device interfaces (702/802), as will be discussed further below. Additionally, each device (110/120/225) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 722, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the natural language command processing system component(s) 120, or a skill system component(s) 225 may include their own dedicated processors, memory, and/or storage. Alternatively, one or more of the components of the device(s) 110, the natural language command processing system component(s) 120, or a skill system component(s) 225 may utilize the I/O interfaces (702/802), processor(s) (704/804), memory (706/806), and/or storage (708/808) of the device(s) 110, natural language command processing system component(s) 120, or the skill system component(s) 225, respectively. Thus, the ASR component 150 may have its own I/O interface(s), processor(s), memory, and/or storage; the NLU component

260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system component(s) 225, as described herein, are illustrative, and may be located as a stand-alone device or may be included, in whole or in part, as a component of a larger device or system.

Figure 9:
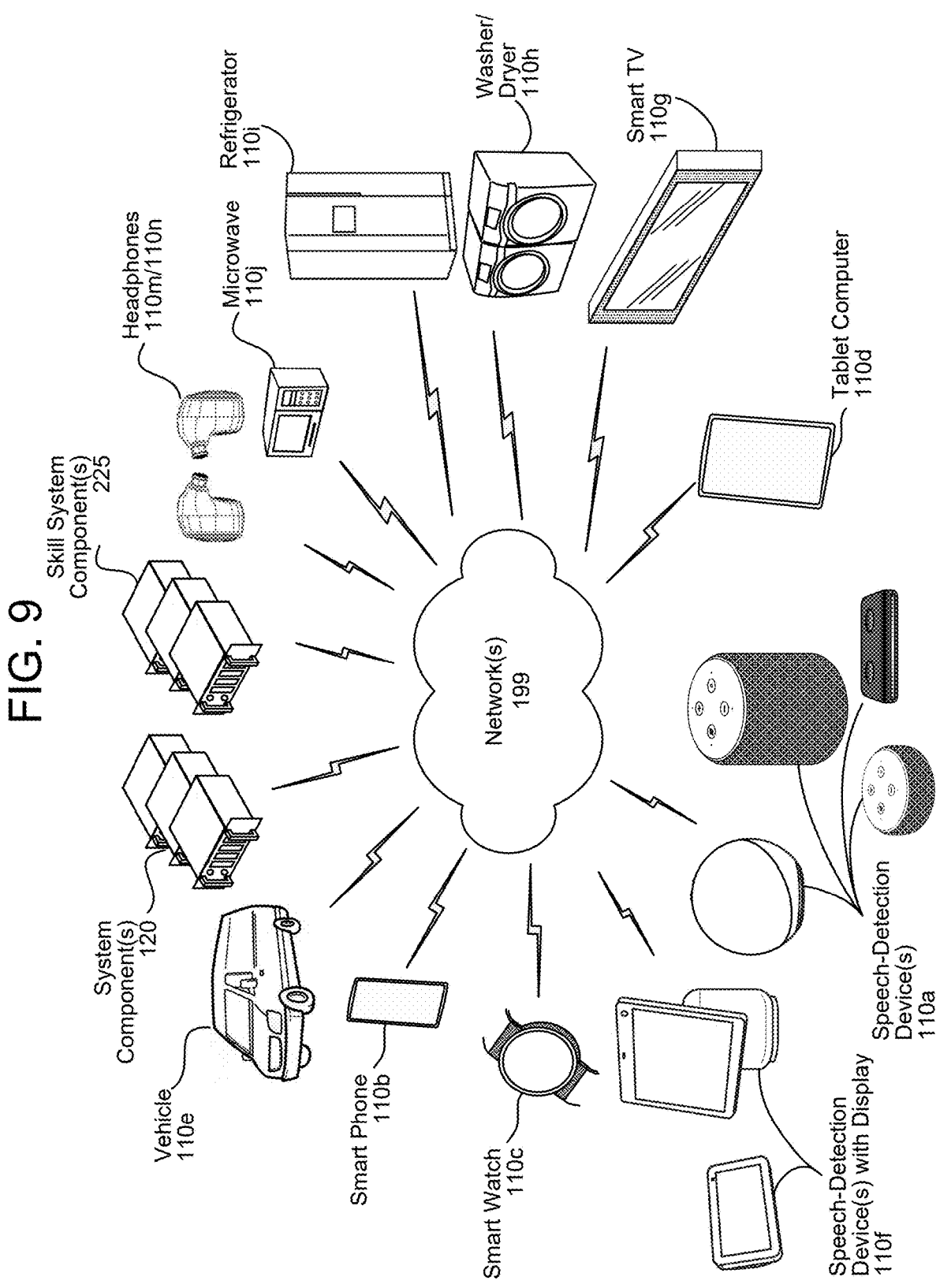
FIG. 9 illustrates an example of a computer network for use with the overall system, according to embodiments of the present disclosure.

As illustrated in FIG. 9, multiple devices (110a-110n, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a WiFi or cellular network connection, or the like. Other devices are included as network-connected support devices, such as the natural language command processing system component(s) 120, the skill system component(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 260, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input audio data representing an utterance;
determining a user profile corresponding to a speaker of the utterance;
determining a first entity associated with the user profile, the first entity corresponding to a first name;
retrieving a first feature vector representing a plurality of graphemes associated with the first name;
retrieving a second feature vector representing a plurality of phonemes associated with pronunciation of the first name;
processing the input audio data using an audio encoder to determine first encoded audio data and second encoded audio data;
processing the first feature vector, the second feature vector, and the first encoded audio data to determine a bias vector;
processing the bias vector and the second encoded audio data to determine third encoded audio data; and
processing the third encoded audio data using a recurrent neural network to determine a transcription of the utterance.

2. The computer-implemented method of claim 1, further comprising:

processing the input audio data to determine:
first interim encoded audio data output by a first layer of the audio encoder, and
second interim encoded audio data output by a second layer of the audio encoder;
determining a first plurality of weight values;
determining a second plurality of weight values;
processing the first interim encoded audio data and the first plurality of weight values to determine first weighted interim encoded audio data;
processing the second interim encoded audio data and the second plurality of weight values to determine second weighted interim encoded audio data; and
determining the first encoded audio data using the first weighted interim encoded audio data and the second weighted interim encoded audio data.

3. The computer-implemented method of claim 2, further comprising:
using the first interim encoded audio data and the second interim encoded audio data to determine output encoded audio data as output from a final layer of the audio encoder, wherein the second encoded audio data comprises the output encoded audio data.

4. The computer-implemented method of claim 1, further comprising:
processing the first encoded audio data using a query component of a biasing component;
determining a third feature vector by concatenating the first feature vector and the second feature vector;
processing the third feature vector using a key component of the biasing component; and
processing the first feature vector using a value component of the biasing component,
wherein the bias vector is determined by the biasing component.

5. A computer-implemented method comprising:
receiving input audio data representing an utterance;
determining first data corresponding to text representing a first entity;
determining second data corresponding to a pronunciation representing the first entity;
determining third data corresponding to text representing a second entity;
determining fourth data corresponding to a pronunciation representing the second entity;
processing the first data, the second data, the third data, and the fourth data to determine bias data corresponding to a context of the utterance;
processing the input audio data to determine first encoded audio data;
processing the first encoded audio data and the bias data to determine adjusted first encoded audio data; and
processing the adjusted first encoded audio data to determine output data representing a transcription of the utterance, wherein the output data represents the first entity.

6. The computer-implemented method of claim 5, further comprising:
determining a user profile associated with the input audio data;
determining the user profile is associated with the first entity and the second entity; and
based at least in part on the user profile being associated with the first entity and the second entity, selecting the first data, the second data, the third data, and the fourth data for processing to determine the bias data.

7. The computer-implemented method of claim 5, further comprising:
determining a display associated with an utterance is presenting information related to the first entity and the second entity; and
based at least in part on the display is presenting information related to the first entity and the second entity, selecting the first data, the second data, the third data, and the fourth data for processing to determine the bias data.

8. The computer-implemented method of claim 5, further comprising:
processing the input audio data to determine:
first interim encoded audio data output by a first layer of an audio encoder, and
second interim encoded audio data output by a second layer of the audio encoder;
determining a first plurality of weight values;
determining a second plurality of weight values;
processing the first interim encoded audio data and the first plurality of weight values to determine first weighted interim encoded audio data;
processing the second interim encoded audio data and the second plurality of weight values to determine second weighted interim encoded audio data; and
determining second encoded audio data using the first weighted interim encoded audio data and the second weighted interim encoded audio data,
wherein the second encoded audio data is also processed to determine the bias data.

9. The computer-implemented method of claim 8, further comprising:
using the first interim encoded audio data and the second interim encoded audio data to determine output encoded audio data as output from a final layer of the audio encoder, wherein the first encoded audio data comprises the output encoded audio data.

10. The computer-implemented method of claim 8, further comprising:
processing the second encoded audio data using a query component of a biasing component;
processing the first data and the second data using a key component of the biasing component; and
processing the first data using a value component of the biasing component,
wherein the bias data is determined by the biasing component.

11. The computer-implemented method of claim 5, further comprising:
processing the adjusted first encoded audio data using a recurrent neural network to determine output distribution data and output probability data; and
processing the output distribution data and output probability data using a selection component to determine the output data.

12. A system comprising:
at least one processor; and
memory including instructions operable to be executed by the at least one processor to cause the system to:
receive input audio data representing an utterance;
determine first data corresponding to a text representing a first entity;
determine second data corresponding to a pronunciation representing the first entity;
determine third data corresponding to text representing a second entity;

determine fourth data corresponding to a pronunciation representing the second entity;

process the first data, the second data, the third data, and the fourth data to determine bias data corresponding to a context of the utterance;

process the input audio data to determine first encoded audio data;

process the first encoded audio data and the bias data to determine adjusted first encoded audio data; and process the adjusted first encoded audio data to determine output data representing a transcription of the utterance, wherein the output data represents the first entity.

13. The system of claim 12, wherein the memory further comprises instructions that, when executed by the at least one processor, further cause the system to:

determine a user profile associated with the input audio data;

determine the user profile is associated with the first entity and the second entity; and based at least in part on the user profile being associated with the first entity and the second entity, select the first data, the second data, the third data, and the fourth data for processing to determine the bias data.

14. The system of claim 12, wherein the memory further comprises instructions that, when executed by the at least one processor, further cause the system to:

determine a display associated with an utterance is presenting information related to the first entity and the second entity; and based at least in part on the display is presenting information related to the first entity and the second entity, select the first data, the second data, the third data, and the fourth data for processing to determine the bias data.

15. The system of claim 12, wherein the memory further comprises instructions that, when executed by the at least one processor, further cause the system to:

process the input audio data to determine:

first interim encoded audio data output by a first layer of an audio encoder, and second interim encoded audio data output by a second layer of the audio encoder;

determine a first plurality of weight values;

determine a second plurality of weight values;

process the first interim encoded audio data and the first plurality of weight values to determine first weighted interim encoded audio data;

process the second interim encoded audio data and the second plurality of weight values to determine second weighted interim encoded audio data; and determine second encoded audio data using the first weighted interim encoded audio data and the second weighted interim encoded audio data, wherein the second encoded audio data is also processed to determine the bias data.

16. The system of claim 15, wherein the memory further comprises instructions that, when executed by the at least one processor, further cause the system to:

use the first interim encoded audio data and the second interim encoded audio data to determine output encoded audio data as output from a final layer of the audio encoder, wherein the first encoded audio data comprises the output encoded audio data.

17. The system of claim 15, wherein the memory further comprises instructions that, when executed by the at least one processor, further cause the system to:

process the second encoded audio data using a query component of a biasing component;

process the first data and the second data using a key component of the biasing component; and process the first data using a value component of the biasing component, wherein the bias data is determined by the biasing component.

18. The system of claim 12, wherein the memory further comprises instructions that, when executed by the at least one processor, further cause the system to:

process the adjusted first encoded audio data using a recurrent neural network to determine output distribution data and output probability data; and process the output distribution data and output probability data using a selection component to determine the output data.

* * * * *